(12) United States Patent
Pados et al.

(10) Patent No.: US 11,394,594 B2
(45) Date of Patent: Jul. 19, 2022

(54) METHOD AND APPARATUS FOR HIGH DATA RATE LONG RANGE ACOUSTIC AND RF COMMUNICATION USING CHIRP WAVEFORM MODULATION

(71) Applicant: The Research Foundation for The State University of New York, Amherst, NY (US)

(72) Inventors: Dimitrios Pados, Amherst, NY (US); Stella Batalama, Amherst, NY (US); Georgios Skilvanitis, North Tonawanda, NY (US); Song-Wen Huang, Amherst, NY (US)

(73) Assignee: The Research Foundation for The State University of New York, Amherst, NY (US)

( * ) Notice: Subject to any disclaimer, the term of this patent is extended or adjusted under 35 U.S.C. 154(b) by 0 days.

(21) Appl. No.: 17/281,146

(22) PCT Filed: Sep. 30, 2019

(86) PCT No.: PCT/US2019/053909
§ 371 (c)(1),
(2) Date: Mar. 29, 2021

(87) PCT Pub. No.: WO2020/069530
PCT Pub. Date: Apr. 2, 2020

(65) Prior Publication Data
US 2021/0344538 A1  Nov. 4, 2021

Related U.S. Application Data

(60) Provisional application No. 62/738,211, filed on Sep. 28, 2018.

(51) Int. Cl.
*H04L 27/26* (2006.01)
*H04B 1/7087* (2011.01)
*H04J 13/00* (2011.01)
*H04L 27/00* (2006.01)
(Continued)

(52) U.S. Cl.
CPC ......... *H04L 27/264* (2013.01); *H04B 1/7087* (2013.01); *H04J 13/0077* (2013.01);
(Continued)

(58) Field of Classification Search
CPC ............... H04L 27/264; H04L 27/0014; H04L 27/26025; H04L 27/2639; H04L 27/3405;
(Continued)

(56) References Cited

U.S. PATENT DOCUMENTS

| 6,215,430 B1 | 4/2001 | Smith et al. |
| 6,937,108 B2 | 8/2005 | Jenkins |

(Continued)

FOREIGN PATENT DOCUMENTS

| CN | 103888405 A | 6/2014 |
| WO | 2006/073243 A1 | 7/2006 |

OTHER PUBLICATIONS

Huang, S., Multicarrier Chirp-Division Multiplexing for RF and Underwater Acoustic Communications, Thesis for: Doctor of Philosophy in Electrical Engineering, University at Buffalo, The State University of New York, Feb. 1, 2018, pp. 1-88.
(Continued)

*Primary Examiner* — Fitwi Y Hailegiorgis
(74) *Attorney, Agent, or Firm* — Hodgson Russ LLP

(57) ABSTRACT

The present disclosure may be embodied as a transmitter for multiuser multicarrier-chirp-division-multiplexing ("MU-MCDM") communications. The present disclosure may be embodied as a receive for MU-MCDM communications. The present disclosure may also be embodied as a method for transmitting an MU-MCDM communication signal. The present disclosure may also be embodied as a method for receiving an MU-MCDM communication signal.

20 Claims, 18 Drawing Sheets

(51) Int. Cl.
*H04L 27/34* (2006.01)
*H04B 1/69* (2011.01)

(52) U.S. Cl.
CPC .... *H04L 27/0014* (2013.01); *H04L 27/26025* (2021.01); *H04L 27/2639* (2013.01); *H04L 27/3405* (2013.01); *H04B 2001/6912* (2013.01); *H04L 2027/0057* (2013.01)

(58) Field of Classification Search
CPC ........ H04L 2027/0057; H04L 27/2602; H04B 1/7087; H04B 2001/6912; H04B 11/00; H04B 13/02; H04J 13/0077
USPC .......................................................... 375/260
See application file for complete search history.

(56) References Cited

U.S. PATENT DOCUMENTS

| | | | |
|---|---|---|---|
| 9,094,107 | B1 | 7/2015 | Kumar |
| 2002/0009125 | A1 | 1/2002 | Shi |
| 2002/0181390 | A1 | 12/2002 | Mody et al. |
| 2004/0100897 | A1* | 5/2004 | Shattil ............... H04L 27/26532 370/206 |
| 2014/0269843 | A1* | 9/2014 | Schaffner ................ H04B 1/69 375/139 |
| 2015/0270866 | A1 | 9/2015 | Schaffner |

OTHER PUBLICATIONS

De Oliveira, et al., Orthogonal Chirp Division Multiplexing for Power Line Sensing via Time-Domain Reflectometry, IEEE Sensors Journal, Aug. 2, 2019, vol. 21, No. 2, pp. 955-964.
Dib, L., Multichirp Code Division Multiple Cccess For Smart Grids and Internet of Things, Thesis for Graduate Degree in Electrical Engineering, Federal University of Juiz de Fora, Brazil, 2018, pp. 1-87.
Rema, K.V., et al., MIMO OCDM with reduced PAPR, 2017 International Conference on Intelligent Computing and Control (I2C2), IEEE, Jun. 23-24, 2017, pp. 1-6.
Ju, Y., et al., A New Efficient Chirp Modulation Techniquie for Multi-User Access Communications Systems, 2004 IEEE International Conference on Acoustics, Speech, and Signal Processing, IEEE, May 17-21, 2004, pp. 1-4.
Bouvet, P., et al., On the analysis of orthogonal chirp division multiplexing for shallow water underwater acoustic communication, OCEANS 2017—Aberdeen, IEEE, Jun. 19-22, 2017, pp. 1-5.
Ouyang, X., et al., Orthogonal Chirp Division Multiplexing, IEEE Transactions on Communications, IEEE, Jul. 27, 2016, vol. 64, No. 9, pp. 3946-3957.
Shi, J., et al., Towards Robust High Speed Underwater Acoustic Communications Using Chirp Multiplexing, OCEANS 2018 MTS/IEEE Charleston, IEEE, Oct. 22-25, 2018, pp. 1-5.
Jia, X, et al., Research on Code Division Multiple Access Based on Chirp Multi-Carrier, 2018 OCEANS—MTS/IEEE Kobe Techno-Oceans (OTO), IEEE, May 28-31, 2018, pp. 1-6.
Lv, X., et al., A Joint Radar-Communication System Based on OCDM-OFDM Scheme, 2018 International Conference on Microwave and Millimeter Wave Technology (ICMMT), IEEE, May 7-11, 2018, pp. 1-3.

\* cited by examiner

METHOD AND APPARATUS FOR HIGH DATA RATE LONG RANGE ACOUSTIC AND RF COMMUNICATION USING CHIRP WAVEFORM MODULATION

CROSS-REFERENCE TO RELATED APPLICATIONS

This application claims priority to U.S. Provisional Application No. 62/738,211, filed on Sep. 28, 2018, the disclosure of which is incorporated herein by reference.

STATEMENT REGARDING FEDERALLY SPONSORED RESEARCH

This invention was made with government support under contract no. CNS-1704813 awarded by the National Science Foundation. The government has certain rights in the invention.

FIELD OF THE DISCLOSURE

The present disclosure relates to a method and apparatus for high data-rate acoustic and radio frequency communications.

BACKGROUND OF THE DISCLOSURE

Wireless communication methods and apparatus that maximize data rate over acoustic and radio frequency ("RF") channels can enable a rich body of applications with unprecedented societal impact. Key applications in RF wireless networks include autonomous cars, smart cities, and the internet-of-things, to name a few.

Underwater acoustic ("UW-A") wireless networks have attracted significant attention for military and civilian applications including oceanographic data collection, disaster prevention, tactical surveillance, offshore exploration, and pollution monitoring, while unmanned aerial RF communication systems that are fully mobile can assist humans in extreme or difficult-to-reach environments and provide cost-effective wireless connectivity in areas without infrastructure coverage.

Even though 70% of the Earth is covered by water, almost 95% of the underwater world remains unexplored, mainly due to the complexity, size, and extreme harshness of the underwater environment. RF electromagnetic waves propagate at long distances through conductive water only at extra low frequencies (30-300 Hz). These low frequency signals require large antennae and high transmission power due to high rates of attenuation. Although optical waves do not suffer from such high attenuation, they are affected by scattering and require high precision in pointing laser beams, which makes them unsuitable for underwater networks. As a result, acoustic (including ultrasound) signaling is the preferred option for underwater networked systems, yet the physical nature of the water propagation medium introduces time-varying and multiple propagation paths, high and variable propagation delay, and Doppler spread, and therefore limits significantly the available bandwidth and achievable data rates in underwater acoustic channels.

Underwater acoustic ("UW-A") communication techniques have been developed for various applications, including offshore remote control, underwater pollution control, environmental monitoring, underwater sensor networks, underwater surveillance and defense. The UW-A channel poses several challenges such as severe attenuation loss, variable multipath propagation delay, ambient noise, large frequency and time spreading (i.e., Doppler effect), limited bandwidth and frequency selective fading that significantly restrict the data rate of existing communication technology. UW-A communication links are significantly band-limited due to absorption of high-frequency energy as well as multiple noise sources in low frequencies, including both man-made and natural processes such as wind, seismic activity, shipping traffic, and turbulence.

State-of-the-art existing underwater acoustic communication technologies mainly rely on very low acoustic frequencies (3 to 30 kHz) that can achieve low data rates (lower than 70 kbit/s). At the same time, the majority of existing commercial underwater acoustic modems rely on inherently fixed, not easily reprogrammable hardware architectures and network protocol designs that are tailored to application-specific networking scenarios. Consequently, rapid prototyping and real-world evaluation of new protocol designs is prohibitive in terms of both implementation time and cost. There are a handful of companies that offer commercial acoustic modems that support different data rates for different communication ranges and applications. DSPComm offers an underwater wireless modem called AquaComm. AquaComm is able to achieve a data rate of 480 bit/s over a 3 km underwater link. AquaSent AM-OFDM-13A is an underwater acoustic modem that has a communication range of 5 km and a maximum data rate of 9 kbit/s. Teledyne Benthos, a leading manufacturer of underwater acoustic equipment in the United States, offers a wide range of acoustic modems that incorporate proprietary phase-shift keying ("PSK") and multiple-frequency-shift keying ("MFSK") transmission schemes supporting data rates up to 15 kbit/s over (2-6 km) underwater links. LinkQuest UWM2200 is another wireless underwater modem that can support a maximum data rate of 38 kbit/s up to a range of 1 km. EvoLogics offers an underwater acoustic modem, 52CMHS, that is reported to have a maximum data rate of 62.5 kbit/s and can operate over a range of 300 m. Because of the physical characteristics of underwater acoustic propagation, only acoustic waves at low frequencies (e.g., less than 50 kHz) can propagate over kilometer-range distances. Commercial modems generate acoustic waves through low-frequency piezoelectric resonators, which inevitably have limited bandwidth (i.e., in the order of a few kHz). However, for sensing and command & control applications of interest to oil and gas and fishing industries, among others, it would be desirable to use wider bandwidths and generate wideband multicarrier waveforms to communicate at high data rates.

Accordingly, there is a critical, long-felt need for high data-rate underwater acoustic communications over moderately long distances.

Chirp signals have been utilized widely in radar, sonar, and communication systems, primarily due to their pulse compression, spread spectrum, superior correlation characteristics and resilience to multipath propagation delays and Doppler spread. Applications in UW-A and RF communication systems include linear chirp signals for navigation and underwater probing, packet/frame synchronization, channel estimation, Doppler estimation and compensation.

Linear chirps have been used in Orthogonal Frequency-Division Multiplexing ("OFDM") communication systems for enhancing their tolerance over Doppler spread and long propagation delays. Work in this field has investigated chirp waveform designs for multiple transmitters in radar systems, and multiple-input multiple-output ("MIMO") communications. Chirp spread spectrum ("CSS") modulation techniques that use wideband linear frequency modulated chirp pulses to encode information have been presently-disclosed for low-power, long range communications.

However, linear chirps are not rigorously orthogonal to each other. Propelled by the need for attaining high data communication rates, recent research work in the literature proposes to use different types of transforms such as the fractional Fourier transform ("FrFT"), fractional cosine transform, and the Fresnel transform to address the problem of orthogonally multiplexing chirp signals.

Hence, developing a low complexity multicarrier chirping modulation method is still of interest for researchers of UW-A and RF wireless communications.

BRIEF SUMMARY OF THE DISCLOSURE

In an aspect, the present disclosure may be embodied as a transmitter for multiuser multicarrier-chirp-division-multiplexing ("MU-MCDM") communication. The transmitter includes a symbol mapper configured to map a multiuser data set to a plurality of baseband symbols; an inverse orthogonal chirp transform configured to modulate the plurality of baseband symbols to a plurality of chirp modulated waveforms according to a predetermined subcarrier allocation scheme and generate a plurality of parallel multicarrier chirp division multiplexing ("MCDM") symbols mapped to frequency subcarriers; a parallel-to-serial converter configured to convert the plurality of parallel MCDM symbols into a serial digital signal, wherein the serial digital signal comprises the plurality of MCDM symbols as consecutive MCDM symbols; a preamble module configured to insert one or more preamble blocks into the serial digital signal; and a zero padding module configured to insert one or more zero values between consecutive MCDM symbols in the serial digital signal. The serial digital signal may further include a plurality of pilot/training symbols assigned to one or more pilot subcarriers.

In some embodiments, the subcarrier allocation scheme is configured for block-type multiuser access. In some embodiments, the subcarrier allocation scheme is configured for comb-type multiuser access.

The transmitter may further include a digital-to-analog convertor configured to convert the serial digital signal into an analog baseband frequency signal; a mixer configured to upconvert the analog baseband frequency signal into an analog carrier frequency signal; a power amplifier configured to increase the amplitude of the analog carrier frequency signal; and an acoustic transducer or an antenna configured to transmit the analog carrier signal in acoustic or radio frequencies.

The transmitter may include a radio. The radio may be a software-defined radio. The radio may have a processor, such as, for example, a microprocessor, a central processing unit (CPU), a graphics processing unit (GPU), a field-programmable gate array (FPGA), an application-specific integrated circuit (ASIC), a digital signal processor (DSP), etc. The radio may further include a processor configured to digitally upsample the sampled signal.

The plurality of baseband symbols may be symbols of a phase shift keying or quadrature amplitude digital modulation scheme.

In another aspect, the present disclosure may be embodied as a method for multiuser multicarrier-chirp-division-multiplexing ("MU-MCDM") communications. The method includes mapping a multiuser data set to a plurality of baseband symbols; using an inverse orthogonal chirp transform to modulate the plurality of baseband symbols with a plurality of chirp modulated waveforms according to a predetermined subcarrier allocation scheme and generate a plurality of parallel MCDM symbols mapped to frequency subcarriers; converting the plurality of parallel MCDM symbols into a serial digital signal, wherein the serial digital signal comprises the plurality of MCDM symbols as consecutive MCDM symbols; inserting one or more preamble blocks into the serial digital signal; inserting zero-padding blocks between consecutive MCDM symbols of the serial digital signal; converting the serial digital signal into an analog baseband frequency signal; upconverting the analog baseband frequency signal into an analog carrier frequency signal; and transmitting the analog carrier frequency signal in acoustic or radio frequencies.

The method may further include digitally upsampling the serial digital signal. The method may further include amplifying the analog carrier frequency signal. The plurality of baseband symbols may be symbols of a digital modulation scheme. For example, the digital modulation scheme may be binary phase shift keying ("BPSK"), quadrature phase shift keying ("QPSK"), or quadrature amplitude modulation ("QAM").

In some embodiments, the subcarrier allocation scheme is configured for block-type multiuser access. In some embodiments, the subcarrier allocation scheme is configured for comb-type multiuser access.

In another aspect, the present disclosure may be embodied as a receiver for multiuser multicarrier-chirp-division-multiplexing ("MU-MCDM") communication. The receiver includes a serial-to-parallel converter configured to convert a serial digital signal into a plurality of MCDM symbols mapped to a plurality of frequency subcarriers; an orthogonal chirp transform configured to demodulate the plurality of MCDM symbols according to a plurality of chirp modulated waveforms and generate a plurality of baseband symbols; a channel estimator configured to estimate channel coefficients of each frequency subcarrier of the plurality of frequency subcarriers; a symbol detector configured to detect a multiuser data set based on the channel coefficients and the baseband symbols.

The transmitter may include a radio. The radio may be a software-defined radio. The radio may have a processor, such as, for example, a microprocessor, a central processing unit (CPU), a graphics processing unit (GPU), a field-programmable gate array (FPGA), an application-specific integrated circuit (ASIC), a digital signal processor (DSP), etc. The radio may further include a processor configured to digitally upsample the sampled signal.

The receiver may further include an acoustic transducer or antenna configured to receive an analog carrier frequency signal; a power amplifier configured to increase the amplitude of the analog carrier frequency signal; a band pass filter configured to remove out-of-band frequency components from the analog carrier frequency signal; a mixer configured to downconvert the analog carrier frequency signal into an analog baseband frequency signal; and an analog-to-digital convertor configured to convert the analog baseband frequency signal into the serial digital signal.

The receiver may further include a processor. The processor may be configured for digital downsampling of the serial digital signal. The receiver may further comprise a packet/frame synchronization module configured to detect one or more preamble blocks of the serial digital signal. The plurality of baseband symbols may be symbols of a digital modulation scheme. For example, the digital modulation scheme may be binary phase shift keying ("BPSK"), quadrature phase shift keying ("QPSK"), or quadrature amplitude modulation ("QAM"). A channel estimator of the receiver may be configured to estimate the channel coefficients of a group of frequency subcarriers based on a plurality of pilot subcarriers.

In another aspect, the present disclosure may be embodied as a method for receiving a multiuser multicarrier-chirp-division-multiplexing ("MU-MCDM") communication signal. The method includes receiving an analog carrier frequency signal; downconverting the analog carrier frequency signal into an analog baseband frequency signal; converting the analog baseband frequency signal into a serial digital signal; converting the serial digital signal into a plurality of multicarrier chirp division multiplexing ("MCDM") symbols mapped to a plurality of frequency subcarriers; using an orthogonal chirp transform to demodulate the plurality of MCDM symbols according to a plurality of chirp modulated waveforms to generate a plurality of baseband symbols; estimating channel coefficients of each frequency subcarrier of the frequency subcarriers; and detecting a multiuser data set based on the channel coefficients and the baseband symbols.

In some embodiments, the method further includes digitally downsampling the serial digital signal. In some embodiments, the method further includes detecting the one or more preamble blocks of the analog carrier frequency signal.

The plurality of baseband symbols may be symbols of a digital modulation scheme. For example, the digital modulation scheme may be binary phase shift keying ("BPSK"), quadrature phase shift keying ("QPSK"), or quadrature amplitude modulation ("QAM").

In some embodiments, the subcarrier allocation scheme is configured for block-type multiuser access. In some embodiments, the subcarrier allocation scheme is configured for comb-type multiuser access.

In some embodiments, the method further includes amplifying the analog carrier frequency signal. In some embodiments, the method further includes filtering out-of-band frequency components from the analog carrier frequency signal.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

Embodiments of the present disclosure are described in the context of underwater acoustic ("UW-A") and radio frequency ("RF") communications for explanatory purposes only. A person of ordinary skill in the art would recognize that the embodiments of the present disclosure and the solutions presented herein may be applied to any type of communication technology or communication device. For example embodiments of the present disclosure may be used in any type of communications involving acoustic, RF, and optical transceivers or any other type of transceivers known in the art. Additionally, the term "acoustic" should be understood to be inclusive of all acoustic waveforms, including without limitation, ultrasonic waveforms.

In an exemplary embodiment, the present disclosure provides a multiuser multicarrier chirp-division multiplexing ("MU-MCDM") scheme for underwater-acoustic ("UW-A") and radio frequency ("RF") communication systems. The MU-MCDM scheme carries information symbols over orthogonal chirp frequency subcarriers. The orthogonality of chirp waveforms is analyzed by their cross-correlation coefficients. Embodiments may be implemented as continuous orthogonal chirp transform ("OCT") and discrete orthogonal chirp transform ("DOCT"). MU-MCDM may be adaptive in preamble duration, number of data and pilot subcarriers, guard interval duration to optimize link performance in time varying environments. Additionally, we present channel estimation and symbol detection techniques toward the development of a low complexity coherent receiver. The presently-disclosed MCDM system can be compatible with existing prevailing orthogonal frequency-division multiplexing ("OFDM") architectures. Simulations and experiments carried out over UW-A and RF multipath channels evaluate the performance of the presently-disclosed MU-MCDM system in terms of bit-error-rate ("BER").

Figure 1:
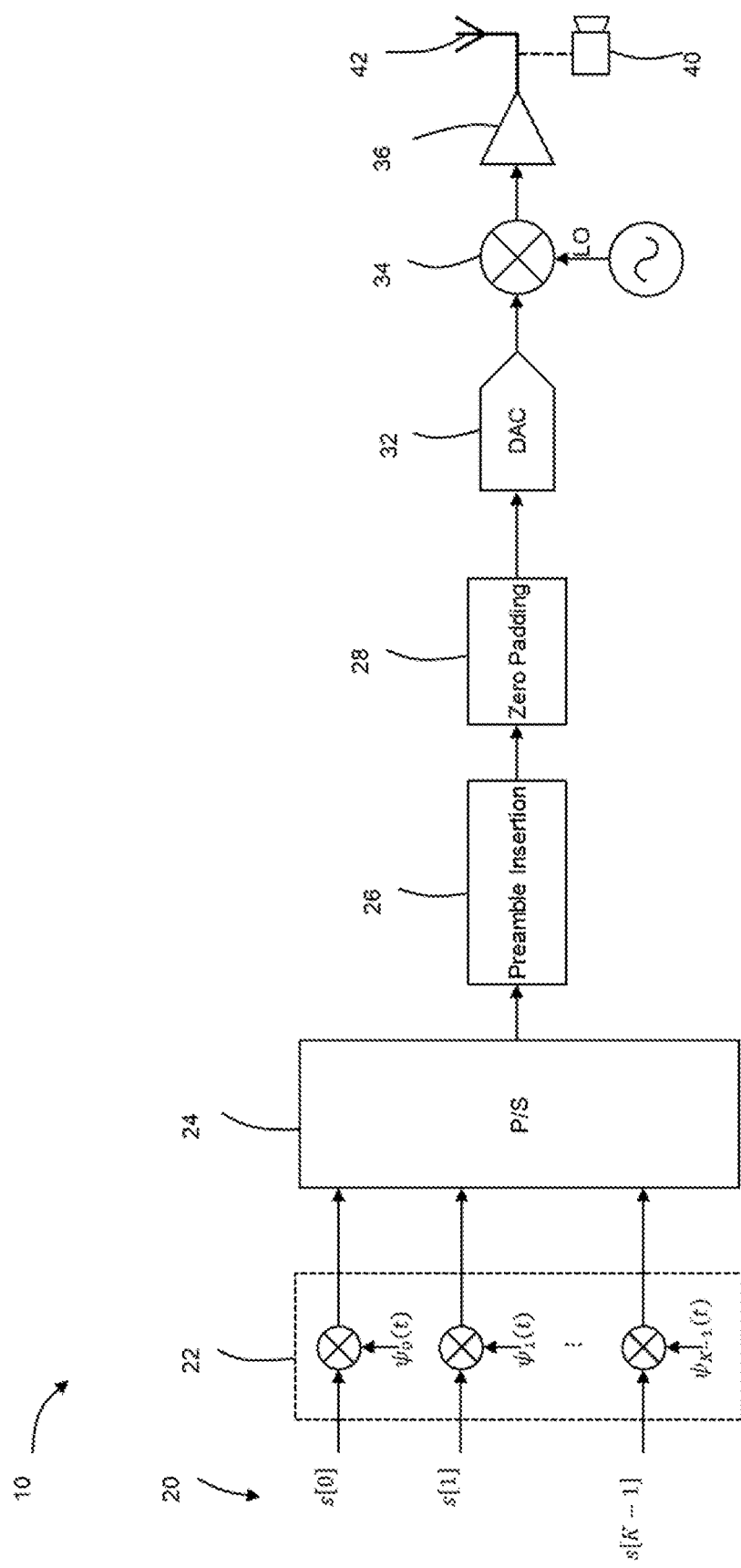
FIG. 1 shows a block diagram of a Multiuser Multicarrier Chirp Division Multiplexing ("MU-MCDM") transmitter according to an embodiment of the present disclosure.

In an aspect of the present disclosure, the present disclosure may be embodied as a transmitter 10 for multiuser multicarrier chirp division multiplexing ("MU-MCDM") communication. The MU-MCDM transmitter 10 utilizes orthogonal chirp waveform modulation. An exemplary embodiment of the present transmitter 10 is shown in FIG. 1.

The transmitter 10 includes a symbol mapper 20 configured to map the data set onto a plurality of input symbols. The plurality of input symbols may be symbols of any digital modulation scheme compatible with existing communication systems and capable of supporting high-rate data transmissions. For example, the plurality of input symbols may be symbols of binary phase shift keying ("BPSK") modulation, quadrature phase shift keying ("QPSK") modulation, or quadrature amplitude modulation ("QAM"), for example, QAM with 32 constellations ("32-QAM").

The transmitter 10 includes an inverse orthogonal chirp transform ("IOCT") 22 as described further below. The IOCT 22 is configured to modulate the plurality of baseband symbols to a plurality of chirp modulated waveforms according to a predetermined subcarrier allocation scheme and generate a plurality of parallel multicarrier chirp division multiplexing ("MCDM") symbols mapped to frequency subcarriers. The generated MCDM symbols are rigorously orthogonal. The chirp frequency subcarriers are selected according to the bandwidth and the carrier frequency of a desired (e.g., predetermined) transmit signal.

Figure 3:
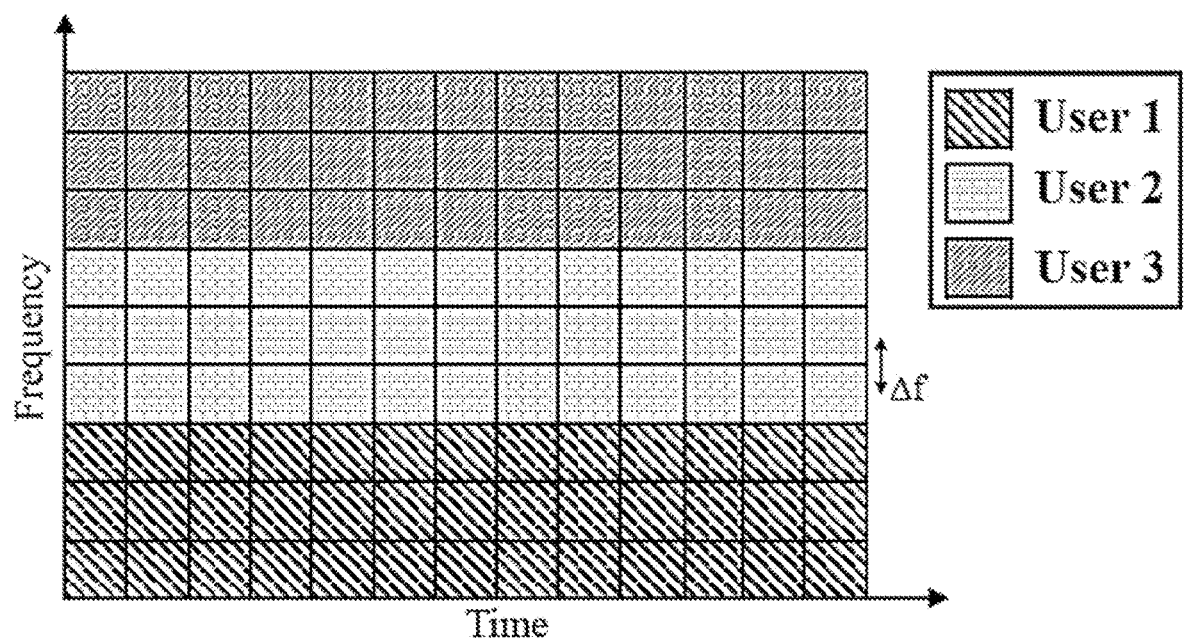
FIG. 3 is a graph illustrating the subcarrier allocation scheme for three different users in a block-type multiuser ("MU") access scenario.

The multiuser subcarrier allocation scheme allows for the simultaneous transmission of the data of multiple users. The multiuser subcarrier allocation scheme may be configured for block-type multiuser access. Block-type multiuser access is formulated by allocating groups of subcarrier frequencies to each user as depicted in FIG. 3. In FIG. 3, frequency subcarriers 1, 2, and 3 are allocated to User 1, subcarriers 4, 5, and 6 are allocated to User 2, and subcarriers 7, 8, and 9 are allocated to User 3. Block-type assignment is typically the simplest subcarrier allocation scheme for manipulation of the multiuser transmitted signals. However, if the channels suffer from selective frequency fading, certain frequency bands may suffer severe attenuation and disturbance.

Figure 4:
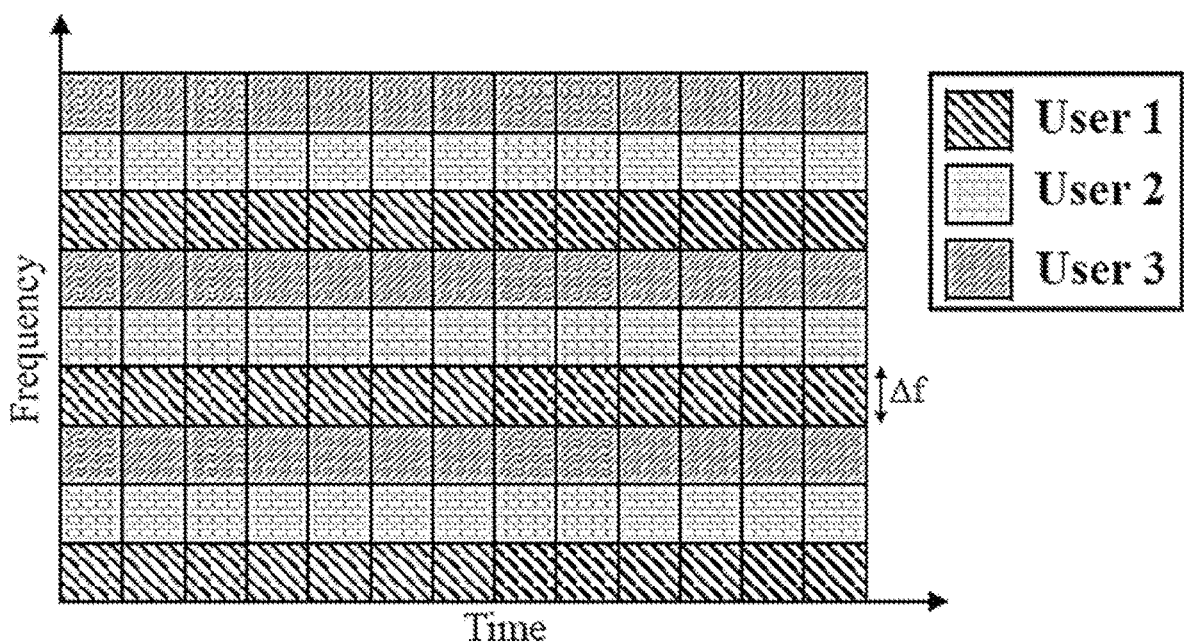
FIG. 4 is a graph illustrating the subcarrier allocation scheme for three different users in a comb-type MU access scenario.

In some embodiments, the multiuser subcarrier allocation scheme may be configured for comb-type multiuser access. Comb-type multiuser access is formulated by allocating subcarrier frequencies to multiple users as depicted in FIG. 4. In FIG. 4, frequency subcarriers 1, 4, and 7 are allocated to User 1, subcarriers 2, 5, and 8 are allocated to User 2, and subcarriers 3, 6, and 9 are allocated to User 3. Comb-type multiuser access distributes fading issues across all users. However, it also makes signal processing more complex, and received symbols may suffer from inter-symbol interference when more than one user symbols are assigned to the same frequency subcarrier.

The MU-MCDM transmitter 10 may further include a parallel-to-serial converter 24 configured to convert the plurality of parallel MCDM symbols into a serial digital signal. The serial digital signal includes the plurality of MCDM symbols as consecutive MCDM symbols. A preamble module 26 is configured to insert one or more preamble blocks into the serial digital signal. The preamble block(s) may be, for example, pseudonoise ("PN")-training block(s). The preamble blocks may be used by a receiver to determine the beginning of a transmitted data packet/frame structure.

Figure 2:
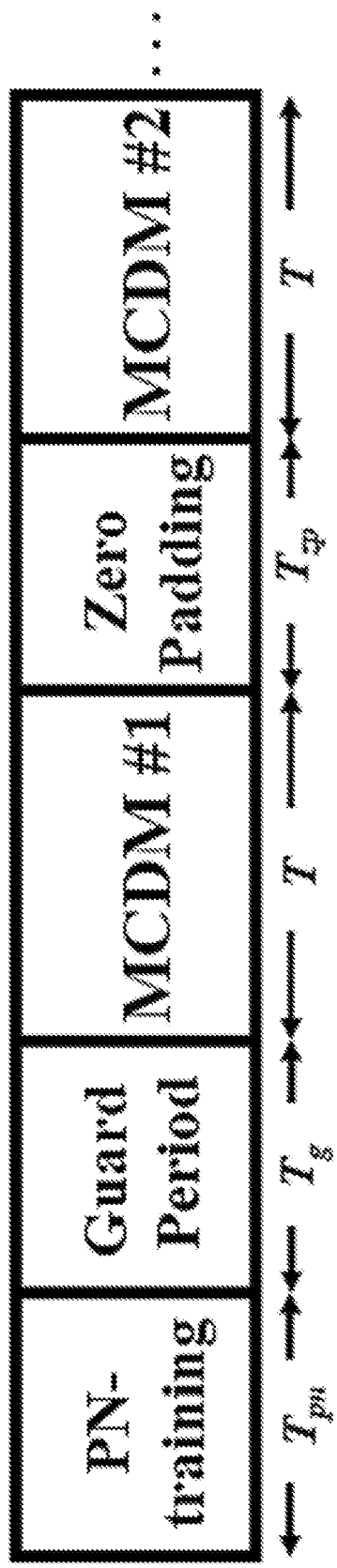
FIG. 2 illustrates the packet structure of data transmitted by an exemplary embodiment of an MU-MCDM system.

The MU-MCDM transmitter may further include a zero padding module 28 configured to insert one or more zeros in between each MCDM symbol of the serial digital signal. An example of the MCDM packet structure is shown in FIG. 2. The serial digital signal may include a plurality of pilot symbols or training symbols among the MCDM data symbols. The pilot symbols or training symbols are known a-priori at the receiver. The pilot symbols or training symbols may be spread uniformly among the MCDM symbols. The pilot symbols may be reference symbols used to estimate channel state information ("CSI") at the receiver. The serial digital signal may further include a plurality of guard periods inserted between the preamble blocks and the MCDM symbols. Zero-padding or guard periods between MCDM symbols are used to prevent inter-symbol and/or inter-carrier interference due to long multipath propagation delays.

The transmitter 10 may further include a digital-to-analog converter (DAC) 32 to convert the serial digital signal into an analog baseband frequency signal. The digital-to-analog converter 32 may receive samples of the serial digital signal (i.e., a sampled signal). In some embodiments, the sampled signal may be upsampled. For example, the transmitter may comprise a processor 30 configured to digitally upsample the sampled signal. The processor 30 may be, for example, a microprocessor, central processing unit ("CPU"), graphics processing unit ("GPU"), a field programmable gate array ("FPGA"), a digital signal processor ("DSP"), an application-specific integrated circuit ("ASIC"), etc.

The transmitter may also have a mixer 34 configured to upconvert the analog base frequency signal to an analog carrier frequency signal (i.e., passband). The mixer 34 may have an input frequency range of, for example, 1 Hz to 100 kHz and an output frequency range of 1 Hz to 170 kHz. It should be noted that these ranges are illustrative and are not necessarily intended to be limiting. In some embodiments, the frequencies may be higher and/or lower. As is known in the art, the mixer 34 may have a local oscillator or may receive a local oscillator signal. The local oscillator may have a frequency of, for example, 100 kHz. Here again, this frequency is illustrative and the local oscillator may have a higher or lower frequency. In acoustic or ultrasonic frequency applications, the analog passband carrier frequency signal may operate at frequencies of 100 kHz, or higher or lower as may be appropriate for a particular application. In RF applications, the analog passband carrier frequency signal may operate at frequencies on the order of 2.4 GHz or higher or lower as may be appropriate for a particular application.

The transmitter 10 may further include an acoustic transducer 40 configured to transmit the analog carrier frequency signal at acoustic frequencies. The acoustic piezoelectric transducer 40 may produce a directivity pattern that is omnidirectional in both the horizontal and vertical axis. For example, the acoustic piezoelectric transducer 40 may be an underwater transducer configured to transmit the analog carrier frequency signal through water.

The transmitter 10 may further include an antenna 42 configured to transmit the analog carrier frequency signal as a wireless radio frequency signal. The antenna 42 may be directional or omnidirectional. The antenna 42 may be configured to transmit signals at any radio frequency (i.e., in any radio frequency band), such as, for example at a frequency within the industrial, scientific, and medical ("ISM") radio frequency band. In some embodiments, the transmitter may include additional analog front-end circuitry used to transmit signals in one or more frequency bands. The transmitted signals may be wireless.

Figure 24:
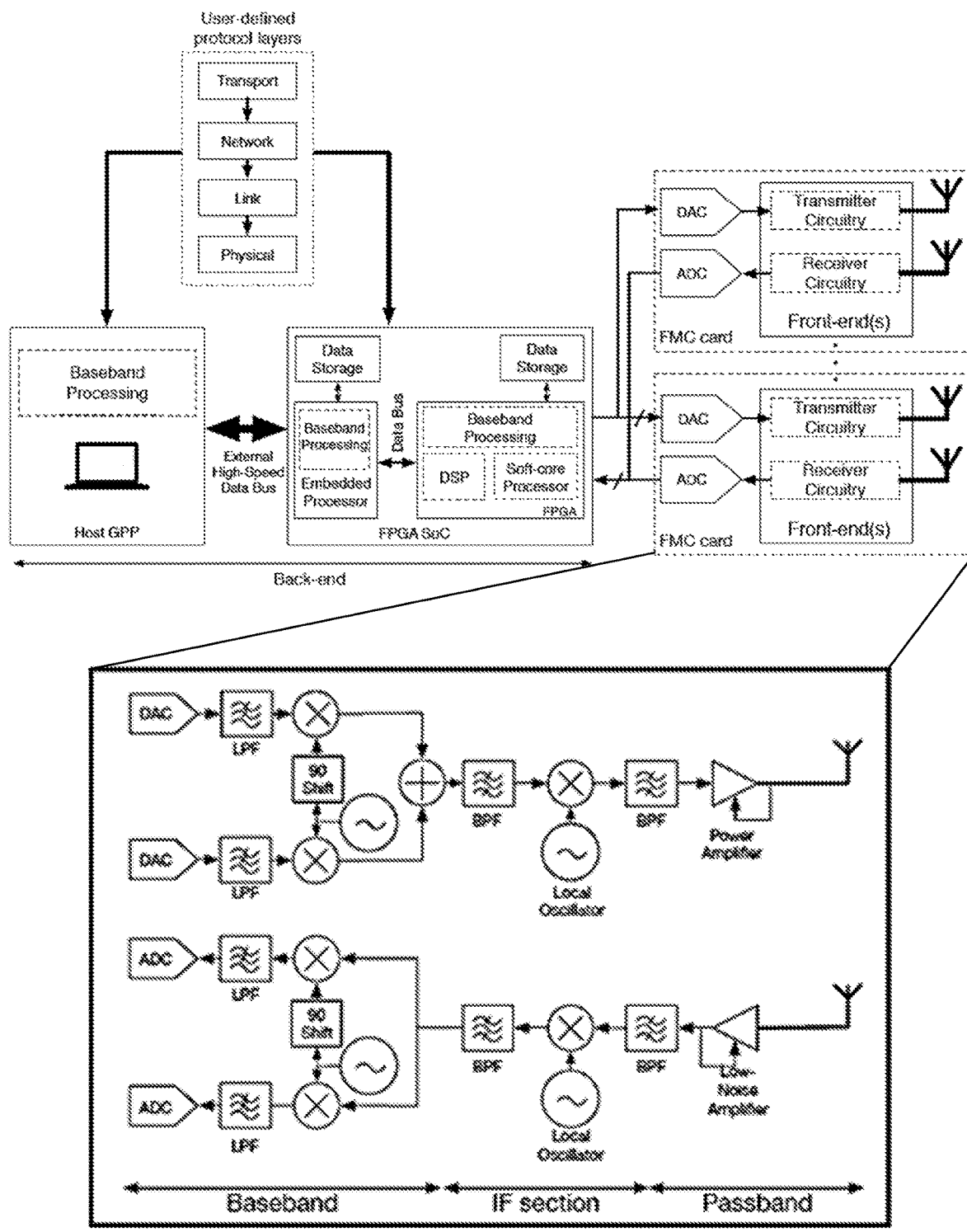
FIG. 24 shows a hardware block diagram of an exemplary embodiment of an MU-MCDM system using a software-defined radio.
Figure 25:
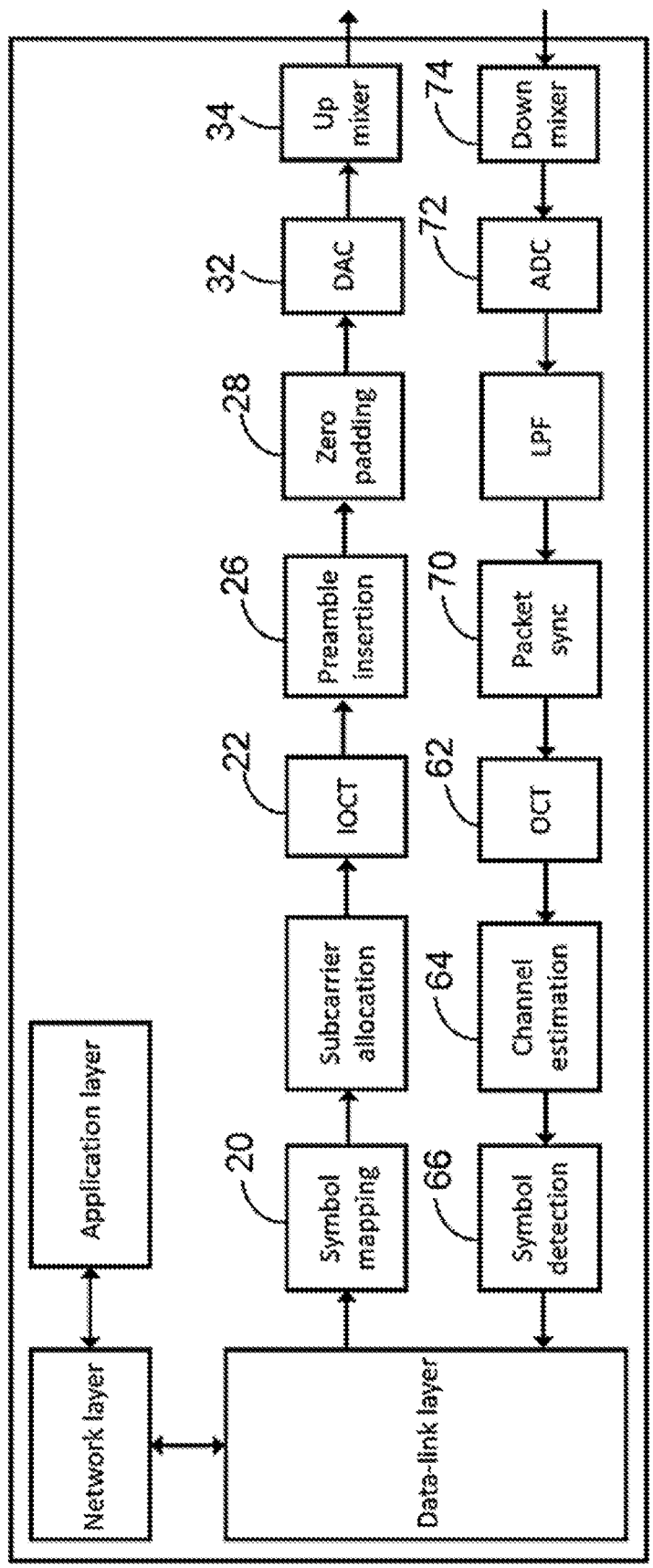
FIG. 25 shows a software block diagram of an embodiment of an MU-MCDM system.

The transmitter 10 may further include an amplifier 36 configured to amplify the analog carrier frequency signal (i.e., at a part of the signal chain before the antenna or acoustic transducer). The amplifier 36 is used to increase the amplitude of the analog carrier frequency signal, at certain frequencies, prior to transmission. The output impedance is advantageously matched to the input impedance of the acoustic transducer 40 or antenna 42 to minimize energy losses. The amplifier 36 may be, for example, a power amplifier. In a particular example used in a test embodiment, the amplifier may have a gain of 26 dB, and an input voltage of 8 to 18 VDC. A block diagram depicting an example of the amplifier 36 amplifying the signal transmitted by the acoustic transducer 40 is shown in FIG. 24.

The MU-MCDM transmitter 10 may include (e.g., may be implemented on) a radio platform 12. The radio platform 12 may be, for example, a software-defined radio. A software-defined radio is a radio in which at least some (traditionally hardware) components such as, for example, modulators, filters, etc., are implemented in software. An example of the hardware architecture underpinning a software-defined radio is shown in FIG. 24. In some embodiments, the radio platform 12 is a hardware-based radio.

Figure 5:
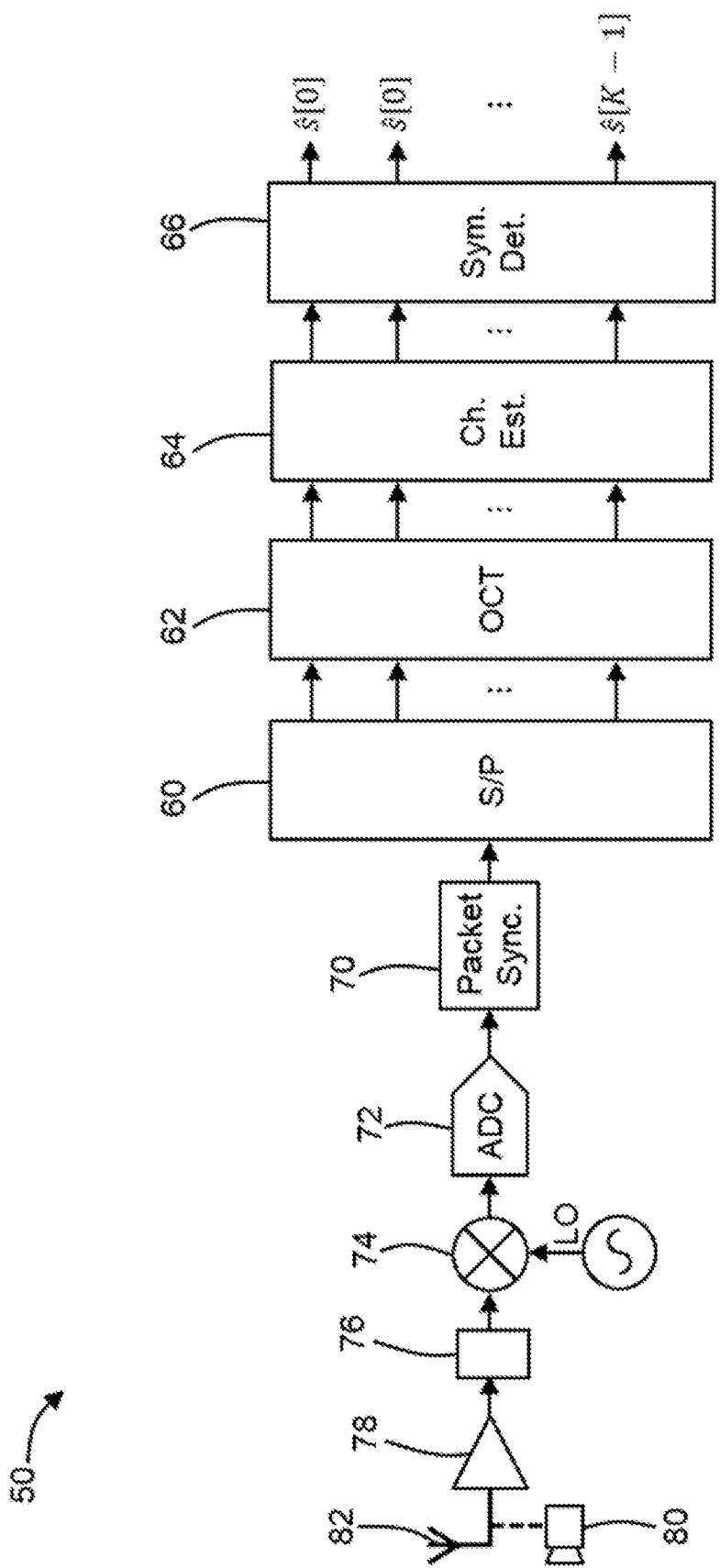
FIG. 5 shows a block diagram of an MU-MCDM receiver according to an embodiment of the present disclosure.

In another aspect, the present disclosure may be embodied as a receiver 50 for MU-MCDM communication. The MU-MCDM receiver 50 utilizes an orthogonal chirp waveform design. A diagram of an illustrative receiver is shown in FIG. 5.

The receiver 50 includes a serial-to-parallel converter 60 configured to convert a serial digital signal into a plurality of MCDM symbols mapped to a plurality of frequency subcarriers.

The receiver 50 includes an orthogonal chirp transform 62 configured to demodulate the plurality of MCDM symbols according to a plurality of chirp modulated waveforms and generate a plurality of baseband symbols.

The receiver 50 includes a channel estimator 64 configured to estimate channel coefficients of each frequency subcarrier of the plurality of frequency subcarriers. The channel estimator 64 may be configured to estimate the channel coefficients of a group of frequency subcarriers based on a plurality of pilot subcarriers. The channel estimator 64 may be configured for comb-type subcarrier allocation and for estimating CSI for every frequency subcarrier. The multiuser subcarrier allocation scheme allows for the simultaneous transmission of the data of multiple users. In some embodiments, the multiuser subcarrier allocation scheme may be configured for comb-type multiuser access. Comb-type multiuser access is formulated by allocating subcarrier frequencies to multiple users as depicted in FIG. 4. In some embodiments, the multiuser subcarrier allocation scheme may be configured for block-type multiuser access. Block-type multiuser access is formulated by allocating groups of subcarrier frequencies to each user as depicted in FIG. 3. The receiver 50 includes a symbol detector 66 configured to detect a multiuser data set based on the channel coefficients and the baseband symbols. The plurality of output symbols may be symbols of any digital modulation scheme compatible with existing communication systems and capable of supporting high-rate data transmissions. For example, the plurality of output symbols may be symbols of BPSK modulation, QPSK modulation, or QAM.

The receiver 50 may include an acoustic piezoelectric transducer 80 or antenna configured to receive an analog carrier frequency signal. The acoustic transducer 80 may receive from a directivity pattern that is omnidirectional in both a horizontal and vertical axis. The acoustic piezoelectric transducer 80 may be configured to receive the acoustic frequency wireless signal underwater. As an example, the analog passband acoustic frequency signal may have a bandwidth of 97 kHz at center carrier frequency of 100 kHz in acoustic frequency applications. In other words, the analog passband carrier frequency signal may span carrier frequencies from 51.5 kHz to 148.5 kHz in acoustic applications.

The receiver 50 may further include an antenna 82 configured to receive an analog passband radio frequency signal. The antenna 82 may be directional or omnidirectional. The antenna 82 may be configured to receive RF signals in the ISM frequency band. The antenna 82 may include additional analog front-end circuitry used to receive signals in different frequency bands. The analog passband RF signals may be received wirelessly. As an example, the analog passband carrier frequency signal may have a bandwidth of 500 kHz at center carrier frequency that can range from 2.5 GHz to 2.9 GHz in RF applications.

A power amplifier 76 may be configured receive the analog carrier frequency signal from the antenna 82 or acoustic transducer 80. The amplifier 76 may be to increase the amplitude of the analog carrier frequency signal. The amplifier 76 is configured to increase the amplitude of the analog passband carrier frequency signal, for certain frequencies, and suppress out-of-band noise to increase the signal-to-noise ratio of the received analog signal and, as a result, improve downstream digital signal processing. The amplifier 76 may be a low noise amplifier. The input impedance of the amplifier may advantageously match the output impedance of the acoustic transducer 80 or antenna 82 to minimize the amount of energy losses. A block diagram depicting an example of the low noise amplifier 76 amplifying the signal received by the acoustic transducer 80 or antenna 82 is shown in FIG. 24. In an example, the amplifier 76 may have a gain of 50 dB, a bandwidth of 1 Hz to 1 MHz, and an input voltage of 10 to 30 VDC.

The receiver 50 may include a band pass filter 76 configured to remove out-of-band (undesired) frequency components from the analog carrier frequency signal. The undesired frequency components may include, for example, harmonics and noise outside of the frequency range of the desired analog passband carrier frequency signal. Bandpass filter(s) may be disposed before and/or after the mixer 74 (see, e.g., FIG. 24).

A mixer 74 may be configured to downconvert the analog carrier frequency signal to an analog baseband frequency signal. For example, in UW-A applications, the mixer 74 may have an input frequency of 1 Hz to 170 kHz and an output frequency of 1 Hz to 100 kHz. It should be noted that these ranges are illustrative and are not necessarily intended to be limiting. In some embodiments, the frequencies may be higher and/or lower. As is known in the art, the mixer 74 may have a local oscillator or may receive a local oscillator signal. The local oscillator may have a frequency of, for example, 100 kHz. Here again, this frequency is illustrative and the local oscillator may have a higher or lower frequency. In acoustic or ultrasonic frequency applications, the analog passband carrier frequency signal may operate at carrier frequencies greater than or equal to 100 kHz. In RF applications, the analog passband carrier frequency signal may operate at carrier frequencies greater than or equal to 2.4 GHz.

The receiver 50 may further include an analog-to-digital converter (ADC) 72 configured to convert the analog baseband frequency signal into a serial digital signal. An example of a transmitted data packet structure is shown in FIG. 2. The MU-MCDM receiver 50 may further include a low pass filter configured to remove noise from the serial digital signal.

The receiver 50 may further include a packet/frame synchronization module 70 configured to detect one or more preamble blocks of the serial digital signal. In this way, the preamble blocks may be used by a receiver to determine the beginning of a received data packet/frame structure. The received signal may include one or more preamble blocks. The preamble blocks may be used by a receiver to determine the beginning of a transmitted data packet structure. The received signal may further include a plurality of pilot subcarriers. Pilot subcarriers may be assigned to pilot or training symbols that are known a-priori at the receiver and used for CSI estimation. The packet synchronization module 70 may provide the processed serial digital signal to the serial-to-parallel converter 60.

The MU-MCDM receiver 50 may include (e.g., may be implemented on) a radio platform 12. The radio platform 12 may be, for example, a software-defined radio. A software-defined radio is a radio in which at least some (traditionally hardware) components such as, for example, modulators, filters, etc., are implemented in software. An example of the hardware architecture underpinning a software-defined radio is shown in FIG. 24. In some embodiments, the radio platform 12 is a hardware-based radio. Such a radio platform may include a processor, such as, for example, a microprocessor, central processing unit (CPU), graphics processing unit (GPU), field-programmable gate array (FPGA), application-specific integrated circuit (ASIC), digital signal processor (DSP), etc. for implementing components of the receiver. In some embodiments, for example, the processor may digitally downsample the serial digital signal.

Figure 26:
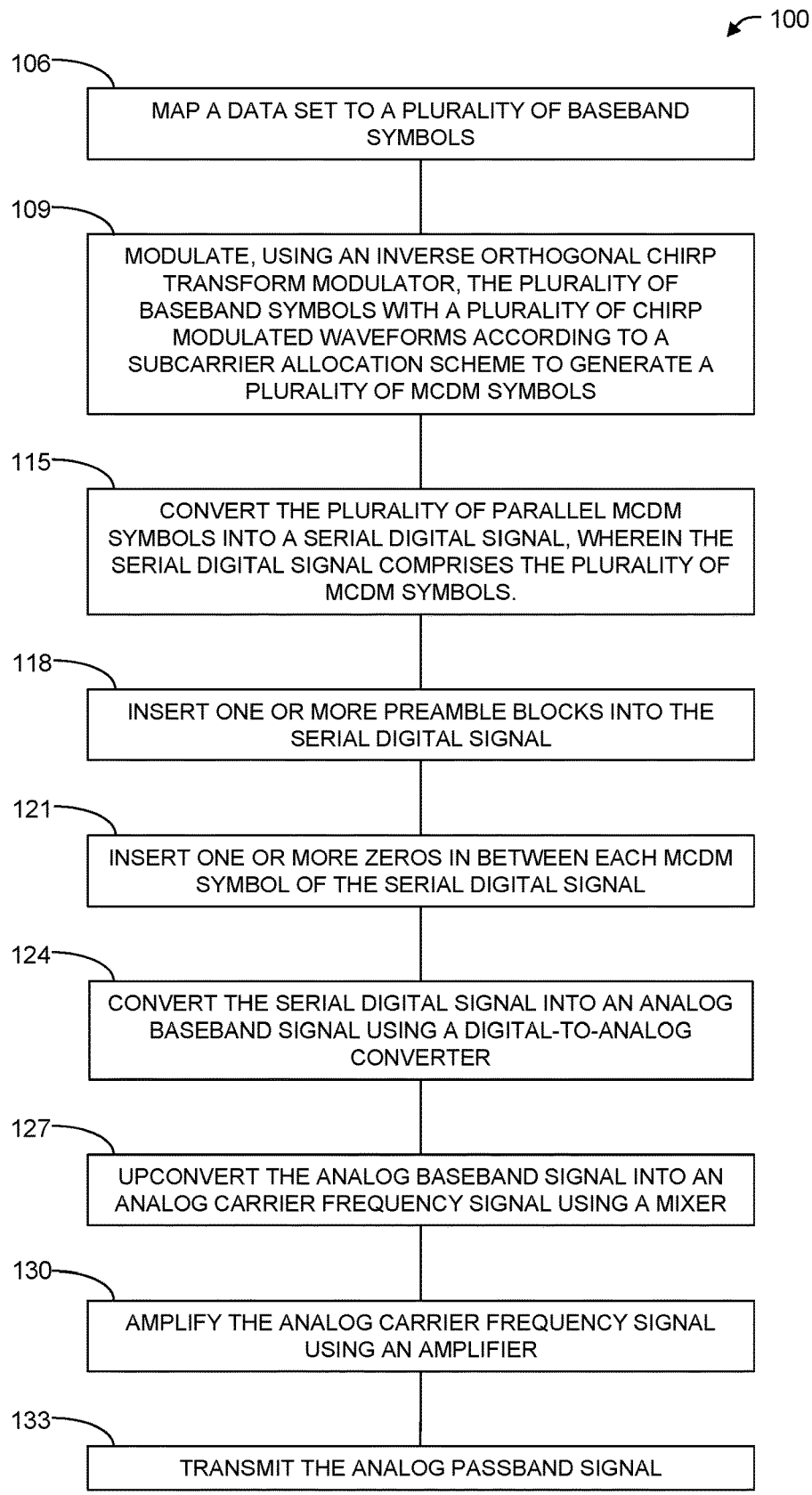
FIG. 26 shows a chart of a method for transmitting an MU-MCDM communication signal according to another embodiment of the present disclosure.

In another aspect, the present disclosure may be embodied as a method 100 for MU-MCDM communications (see, e.g., FIG. 26). The method 100 includes mapping 106 a multiuser data set to a plurality of baseband symbols. In some embodiments, the method also includes obtaining the input data set (e.g., receiving the input data set on an input port). The plurality of baseband symbols may be symbols of any digital modulation scheme compatible with existing communication systems and capable of supporting high-rate data transmissions. For example, the plurality of input symbols may be symbols of BPSK modulation, QPSK modulation, or QAM (e.g., 16-QAM, 32-QAM, etc.)

The method 100 includes modulating 109 the plurality of baseband symbols with a plurality of chirp modulated waveforms using an inverse orthogonal chirp transform according to a subcarrier allocation scheme and thereby generating a plurality of parallel MCDM symbols mapped to frequency subcarriers. Stated another way, an inverse orthogonal chirp transform is used 109 to modulate the plurality of baseband symbols with a plurality of chirp modulated waveforms according to a subcarrier allocation scheme and generate a plurality of parallel MCDM symbols mapped to frequency subcarriers. The subcarrier allocation scheme may be predetermined. The multiuser subcarrier allocation scheme allows for the simultaneous transmission of the data of multiple users. In some embodiments, the multiuser subcarrier allocation scheme may be configured for comb-type multiuser access. Comb-type multiuser access is formulated by allocating subcarrier frequencies to multiple users as depicted in FIG. 4. In some embodiments, the multiuser subcarrier allocation scheme may be configured for block-type multiuser access. Block-type multiuser access is formulated by allocating groups of subcarrier frequencies to each user as depicted in FIG. 3. In some embodiments, the method 100 further includes allocating the frequency subcarriers.

The method 100 includes converting 115 the plurality of parallel MCDM symbols into a serial digital signal. The serial digital signal includes the plurality of MCDM symbols as consecutive MCDM symbols. One or more preamble blocks are inserted 118 into the serial digital signal. Zero-padding blocks (e.g., blocks of one or more zero values) are inserted 121 between consecutive MCD symbols of the serial digital signal.

The method 100 may include converting 124 the serial digital signal into an analog baseband frequency signal using a digital-to-analog converter. The serial digital signal may be sampled and the sampled signal provided to the digital-to-analog converter. In some embodiments, the sampled signal is also upsampled.

The method 100 may also include upconverting 127 the analog baseband frequency signal into an analog carrier (passband) frequency signal using a mixer. The analog carrier frequency signal may then be transmitted 133 in acoustic or radio frequencies. For example, the analog carrier frequency signal may be transmitted 133 by way of an acoustic transducer (at acoustic frequencies, including without limitation, ultrasonic frequencies). In another example, the analog carrier frequency signal may be transmitted 133 as a wireless radio signal using an antenna. In some embodiments, the analog carrier frequency signal is amplified 130 prior to transmission.

Figure 27:
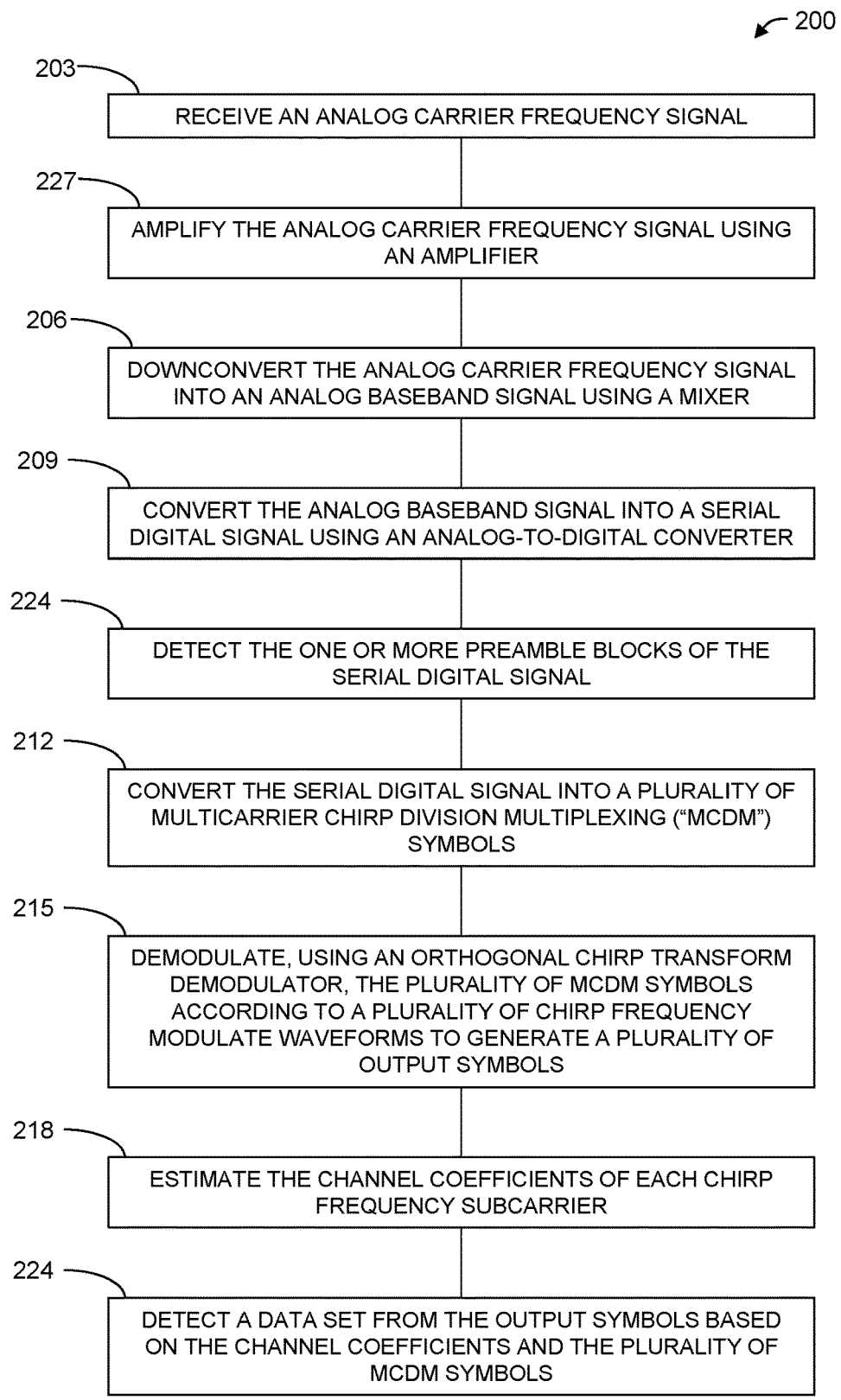
FIG. 27 shows a chart of a method for receiving an MU-MCDM communication signal according to another embodiment of the present disclosure.

In another aspect, the present disclosure may be embodied as a method 200 for MU-MCDM communications at a receiver (see, e.g., FIG. 27). The method 200 includes receiving 203 an analog carrier frequency signal. The received 203 signal may include one or more preamble blocks. The analog carrier frequency signal may be received using an acoustic transducer or an antenna. In this way, the analog carrier frequency signal may originate as an acoustic frequency signal or a radio frequency signal.

The method 200 includes downconverting 206 the analog carrier frequency signal into an analog baseband frequency signal using a mixer. In some embodiments, the analog carrier frequency signal is amplified 227 by an amplifier, such as, for example, a low-noise amplifier. In some embodiments, the analog carrier frequency signal may be filtered to remove (undesired) out-of-band frequency components before and/or after downconverting 206 (see, e.g., FIG. 24). For example, a band pass filter may be used to pass frequencies known to include the desired signal.

The analog baseband frequency signal is converted 209 to a serial digital signal using an analog-to-digital converter (ADC). A low-pass filter may be employed to further reduce undesired noise components from the analog baseband frequency signal before conversion to the serial digital signal. The method 200 includes converting 212 the serial digital signal into a plurality of (parallel) multicarrier chirp division MCDM symbols. For example, a serial-to-parallel conversion circuit or program may be used. The plurality of output symbols may be symbols of any digital modulation scheme compatible with existing communication systems and capable of supporting high-rate data transmissions. For example, the plurality of output symbols may be symbols of BPSK modulation, QPSK modulation, or 32-QAM.

The method 200 for MU-MCDM communications may further include detecting 224 one or more preamble blocks of the serial digital signal for packet (frame) synchronization. The method 200 includes demodulating 215 the plurality of MCDM symbols using an orthogonal chirp transform according to a plurality of chirp modulated waveforms to generate a plurality of baseband symbols.

The method 200 includes estimating 218 channel coefficients of each frequency subcarrier of the plurality of frequency subcarriers. The channel estimator may be configured for comb-type subcarrier allocation for estimating CSI for every frequency subcarrier. The multiuser subcarrier allocation scheme allows for the simultaneous transmission of the data of multiple users. In some embodiments, the multiuser subcarrier allocation scheme may be configured for comb-type multiuser access. Comb-type multiuser access is formulated by allocating subcarrier frequencies to multiple users as depicted in FIG. 4. In some embodiments, the multiuser subcarrier allocation scheme may be configured for block-type multiuser access. Block-type multiuser access is formulated by allocating groups of subcarrier frequencies to each user as depicted in FIG. 3.

A transmitted multiuser data set is detected 221 based on based on the estimated channel coefficients and the plurality of MCDM symbols.

It should be noted that terms such as block and module define components of the transmitter and/or receiver which may be implemented in various ways as will be known to one having skill in the art. For example, a block or module may be implemented as a circuit of discrete components, an integrated circuit, a processor (including those described elsewhere in this disclosure—e.g., FPGA, ASIC, DSP, etc.), a computer-readable software program configured to run on a processor, etc.

Further Discussion and Example

The follow discussion and example provide a description of the functionality and design parameters of an MU-MCDM system for UW-A and RF communication according to an embodiment of the present disclosure.

Orthogonal Chirp Waveform Design

Chirp Waveform Design

We consider a linear chirp signal with a frequency which changes linearly over time. The m-th chirp waveform is therefore represented as:

$$\psi_m(t) = \sqrt{\frac{1}{T}} e^{j(2\pi m \Delta f t + \pi \mu t^2)}, \ 0 \le t \le T \quad (1)$$

where T is the symbol duration, $\Delta f$ is the frequency spacing between chirps (chirp waveforms), $$\mu \triangleq \frac{B_c}{T}$$

is the chirp rate, $B_c$ denotes the bandwidth of the chirp signal, and signal energy has been normalized to 1. The initial frequency of the m-th chirp waveform is $m\Delta f$. For positive chirp rate, i.e., $\mu>0$, the frequency increases with time and $\psi_m(t)$ is an up-chirp signal, while for $\mu<0$, $\psi_m(t)$ is a down-chirp signal (i.e., the frequency decreases with time).

The chirp signals are complex, having both in-phase and quadrature-phase components. The frequency span ($B_c$) of chirp waveforms can provide resilience to multipath propagation delays and Doppler spread.

Orthogonality of Chirp Waveforms

The orthogonality of chirp waveforms can be analyzed by calculating their cross-correlation coefficient. Particularly, the cross-correlation coefficient of the k-th and the l-th chirp waveforms is derived as:

$$\rho_{kl} = \int_0^T \psi_k(t)\psi_l^*(t)dt = \frac{1}{T}\int_0^T e^{j2\pi(k-l)\Delta f t}dt = \delta_{kl} = \begin{cases} 0, & k \ne l \\ 1, & k = l \end{cases} \quad (2)$$

where $$\Delta f \triangleq \frac{1}{T}$$

for ensuring orthogonality.

Equation 2 shows that the cross-correlation coefficient is zero for different chirp signals, thus the present-disclosed waveforms are orthogonal to each other.

Orthogonal Chirp Transform

An orthogonal chirp transform (OCT) is designed on the basis of the orthogonal chirp waveforms as follows:

$$X(f) = \sqrt{\frac{1}{T}} \int_{-\infty}^{\infty} x(t) e^{-j(2\pi f t + \pi \mu t^2)} dt, \quad (3)$$

where x(t) is a continuous-time function and X(f) is the OCT representation of x(t) in the frequency domain. In this way, OCT can transform a time-domain signal into its frequency-domain equivalent.

The inverse orthogonal chirp transform (IOCT) is given by:

$$x(t) = \sqrt{\frac{1}{T}} \int_{-\infty}^{\infty} X(f) e^{j(2\pi ft + \pi\mu t^2)} df. \quad (4)$$

IOCT can transform a frequency-domain signal into its time-domain equivalent. Therefore, OCT and IOCT can be used to transition from a time-domain signal into its frequency form and inversely from a frequency-domain signal into its time-domain form. OCT and IOCT can simplify our implementations and signal representations in time and frequency domain. However, there is still need for discrete signal transforms.

Discrete Orthogonal Chirp Transform

In some implementations, discrete signal transforms may be preferable, since can be impractical to store and process signals in a continuous-time fashion. The discrete orthogonal chirp transform (DOCT) is written as:

$$X[k] = \sqrt{\frac{1}{N}} \sum_{n=0}^{N-1} x[n] e^{-j(2\pi kn + \pi\mu n^2)}, \quad (5)$$

where N is the number of OCT points, X[k] denotes the k-th symbol in frequency, and x[n] is the n-th symbol in time. DOCT can transform a discrete time-domain signal into its frequency-domain equivalent.

The inverse discrete orthogonal chirp transform ("IDOCT") is given by:

$$x[n] = x(t)|_{t=nT_s} = \sqrt{\frac{1}{N}} \sum_{k=0}^{N-1} X[k] e^{j(2\pi kn + \pi\mu n^2)}, \quad (6)$$

where $$T_s = \frac{1}{f_s}$$

is the sampling period. Therefore, DOCT and IDOCT can be used to transition from a discrete time-domain signal into its discrete frequency-domain equivalent, and inversely from a discrete frequency-domain signal into its discrete time-domain equivalent.

In practical implementations, discrete signal representations motivated our designs for DOCT and IDOCT, which are effective transforms for discrete signal processing in communication systems.

System Model

MCDM System Model

Orthogonal chirp waveforms are utilized as frequency subcarriers in the presently-disclosed MCDM modulation system. Hence, the system is benefited by the merits of chirp signals, such as robustness to multipath delay, and time and frequency spreading (i.e., the Doppler effect). The presently-disclosed MCDM system can additionally support high data rates and multiuser access by leveraging the multiplexing capabilities of multicarrier modulation.

The carrier frequency signal in the MU-MCDM system can be described as:

$$x(t) = \sqrt{E} \sum_{k=0}^{K-1} s[k] \psi_k(t) e^{j2\pi f_c t}, 0 \le t \le T \quad (7)$$

where E is the signal energy, s[k] denotes the k-th modulated symbol, $\psi_k(t)$ is the k-th subcarrier continuous-time function, K is the total number of frequency subcarriers, $f_c$ is the carrier frequency, and T is the symbol period. The presently-disclosed MU-MCDM system may utilize different orders of phase-shift keying ("PSK") and quadrature-amplitude modulations ("QAM") for the k-th symbol s [k], e.g., binary phase key shifting ("BPSK"), quadrature phase key shifting ("QPSK"), and quadrature amplitude modulation ("QAM") with unit symbol energy (symbol energy normalized to 1). Hence, signal energy is merely dependent on parameter E.

The signal representation in Equation 7 is the combined output of IOCT and carrier frequency modulation blocks depicted in FIG. 1. Subcarrier allocation for the modulated symbols takes place in the frequency domain. After leveraging IOCT, the time-domain signals are prepared for transmission after preamble insertion, zero padding, and carrier frequency modulation.

Channels are modeled as time varying signals with multiple independent and time varying (in amplitude and time delay) propagation paths as follows:

$$h(t) \triangleq \sum_{m=1}^{M} h_m(t) \delta(t - \tau_m(t)) \quad (8)$$

where M is the total number of resolvable paths, $h_m(t)$ is the m-th path's amplitude, and $\tau_m(t)$ is the m-th path's delay.

The amplitude and delay of each path are assumed to be time-invariant in the duration of an MCDM symbol period. Hence, received baseband signals after carrier frequency demodulation are written as:

$$r(t) = \sqrt{E} \sum_{k=0}^{K-1} \sum_{m=1}^{M} \tilde{h}_m s[k] \psi_k(t - \tau_m) + n(t), \quad (9)$$

where $\tilde{h}_m \triangleq h_m e^{-j2\pi f_c \tau_m} \in \mathbb{C}$ is the m-th path's energy-including channel coefficient, E is the energy per symbol, $\tau_m(t)$ denotes the m-th path's delay, and n(t) is ambient additive noise.

The structure of a transmitted packet/frame of an MU-MCDM communication system is shown in FIG. 2. We a PN-training block containing antipodal sequences $\in \{\pm 1\}^{N_{pn}}$ precedes the transmission for packet synchronization. A guard-interval of duration $T_g$ is inserted between the preamble block and the MCDM symbol of duration T. Additionally, a sequence of zeros with duration $T_{zp}$ is padded to separate MCDM symbols. The zero-padding ("ZP") procedure provides ZP-MU-MCDM with robustness to long multipath propagation delays and inter-symbol interference ("ISI") in time varying UW-A and RF communication channels.

We design a low-complexity coherent receiver for MU-MCDM communications and describe our developments for time synchronization, channel estimation, and symbol detection. Packet/frame synchronization is accomplished by the implementation of a sliding correlator with the preamble sequence that is a-priori known at the receiver. Channel state information ("CSI") is estimated by using pilot subcarriers that are assigned to reference/training symbols. Maximum likelihood symbol decoding is achieved by performing minimum distance decoding over the received signal vectors.

Multiuser Access

Multiuser ("MU") access schemes enable multiplexing of multiuser transmissions over the same communication UW-A or RF channel. MU access is implemented by adaptive subcarrier allocation in the frequency domain. Different users are assigned to non overlapping subcarriers and transmit their own MCDM symbols. To illustrate embodiments of the disclosure, block-type and comb-type subcarrier allocation techniques are described for MU access, though other techniques are within the present scope.

1) Block-type MU Access: Block-type MU access considers subcarrier allocation to multiple users by grouping subcarriers as depicted in FIG. 3, e.g., subcarriers 1, 2, and 3 are allocated for MCDM symbols of User 1, subcarriers 4, 5, and 6 are allocated for MCDM symbols of User 2, and subcarriers 7, 8, and 9 are allocated for MCDM symbols of User 3. Block-type MU access is inherently simple for multiuser management and multiuser subcarrier allocation, however, frequency selective fading in certain frequency bands may significantly degrade the performance of the communication link.

2) Comb-type MU Access: Comb-type MU access considers uniform subcarrier allocation to multiple users as depicted in FIG. 4, e.g., subcarriers 1, 4, and 7 are allocated for MCDM symbols of User 1, subcarriers 2, 5, and 8 are allocated for MCDM symbols of User 2 and subcarriers 3, 6, and 9 are allocated for MCDM symbols of User 3. As a result, the presently-disclosed communication links are resilient to deep fading events that may appear in certain frequency bands, however, the presently-disclosed multiuser subcarrier allocation technique may result in multiuser inter symbol interference ("ISI") in case that more than one user symbols are assigned to the same frequency subcarrier.

The presently-disclosed MU-MCDM communication system that can dynamically adapt communication parameters, such as data and pilot subcarriers in UW-A or RF multipath environments. MU-MCDM communication systems that can dynamically adapt to time varying channel conditions can significantly enhance data communication rate and link reliability. In the following, we describe a low complexity receiver design for MU-MCDM communications that comprises packet synchronization, channel estimation, and symbol detection procedures.

Receiver Design

Receiver design is illustrated in Figure X, including packet synchronization, channel estimation, and symbol detection.

Packet Synchronization

Received signals are first downconverted to a baseband frequency by carrier frequency demodulation. Preamble antipodal bit sequences of length $N_{pn}$ and duration of $T_{pn}$ that are a-priori known at the receiver are utilized for packet/frame synchronization.

The cross-correlation of the received signal with the transmitted preamble sequence is written as $$R_{pn}(\tau) = \int_0^{T_{pn}} x_{pn}(t) r^*(t+\tau) dt, \quad (10)$$

where $(.)^*$ is the complex conjugate operator, $r^*(t+\tau)$ is the received signal shifted by time delay $\tau$, with $\tau \in [0, T_w]$ and $T_w$, denoting the duration of the sliding correlation window, and $x_{pn}(t)$ is the transmitted preamble bit sequence that is modulated on a basic pulse $g(t)$.

The beginning of the packet/frame at the receiver is identified as follows $$\hat{t}_r = \arg\max_{\tau \in [0, T_w]} \|R_{pn}(\tau)\|_2^2 \quad (11)$$

Channel Estimation

Received signal are transformed into the frequency domain by leveraging the Orthogonal Chirp Transform ("OCT"). For the k-th subcarrier, OCT is applied over the frequency band $[k\Delta f, k\Delta f+B_c]$. MCDM symbols are sampled at rate $$T_s = \frac{1}{f_s}.$$

After carrier frequency demodulation and sampling at rate $T_s$, the received MCDM signal vector is written as:

$$y = Hs + n, \quad (12)$$

where $y \in \mathbb{C}^{K \times 1}$ is the received signal vector, $s \in \mathbb{C}^{K \times 1}$ is the transmitted symbol vector, $n \in \mathbb{C}^{K \times 1}$ is the received additive noise vector, $H \in \mathbb{C}^{K \times K}$ is the channel matrix defined as:

$$H \triangleq \begin{bmatrix} h_0 & 0 & \cdots & 0 & 0 \\ 0 & h_1 & \cdots & 0 & 0 \\ \vdots & \vdots & \ddots & \vdots & \vdots \\ 0 & 0 & \cdots & h_{K-2} & 0 \\ 0 & 0 & \cdots & 0 & h_{K-1} \end{bmatrix}, \quad (13)$$

Where $h_k$ is the channel coefficient of the k-th subcarrier, and K is the total number of frequency subcarriers.

Channel matrix $H \in \mathbb{C}^{K \times K}$ is a diagonal matrix, which considers that the subcarrier bandwidth lies within the channel coherence bandwidth, and the amplitude of a subcarrier can be redeemed as unchanged during the channel coherence time.

We consider uniform subcarrier allocation for pilot symbols, where pilot subcarriers are spread evenly across the total number of subcarriers K. More specifically, pilot subcarriers $K_p$, are located at $k=0, L, 2L, \ldots, (K_p-1)L$, where $$L \triangleq \frac{K}{K_p}.$$

Therefore, CSI can be effectively captured across L subcarriers.

After carrier frequency demodulation and sampling at rate $T_s$, the received pilot signal vector is written as $$y_p = S_p h_p + n_p \quad (14)$$

where $y_p \in \mathbb{C}^{K_p \times 1}$ is the received signal vector at the pilot subcarriers, $h_p = [h_{p,0}, h_{p,1}, \ldots, h_{p,K_p-1}]^T \in \mathbb{C}^{K_p \times 1}$ is the corresponding channel vector, $S_p \in \mathbb{C}^{K_p \times K_p}$ is the diagonal pilot data matrix defined as:

$$S_p \triangleq \begin{bmatrix} s_{p,0} & 0 & \cdots & 0 \\ 0 & s_{p,1} & \cdots & 0 \\ \vdots & \vdots & \ddots & \vdots \\ 0 & 0 & \cdots & s_{p,K-1} \end{bmatrix} \quad (15)$$

and $n_p \in \mathbb{C}^{K_p \times 1}$ is additive noise in the pilot subcarriers.

Complex channel coefficients can then be estimated based on the pilot subcarriers as follows $$\hat{h}_p = \arg\min_{h_p \in \mathbb{C}^{K_p \times 1}} \|y_p - S_p h_p\|_2^2, \quad (16)$$

where $\|\ldots\|_2$ denotes the Euclidean norm.

We consider that the pilot data matrix $S_p$ is known a-priori at the receiver. Under the assumption of additive complex white Gaussian noise ("AWGN") $n_p$ with independent and identically distributed zero mean and unit variance entries, the maximum likelihood ("ML") channel estimate is thus given by $$\hat{h}_p = (S_p^H S_p)^{-1} (S_p^H y_p) \quad (17)$$

We consider that channel coefficients vary linearly across neighbor subcarriers and assume narrowband channel fading per subcarrier. Hence, channel coefficients for the non-pilot subcarrier k is estimated as:

$$\hat{h}[k] = \left(1 - \frac{l}{L}\right)\hat{h}_p[m] + \frac{l}{L}\hat{h}_p[m+1], \quad (18)$$

where $\hat{h}_p[m]$ is the estimated channel coefficient of the m-th pilot symbol, l the residue of k divided by L, mL<k<(m+1)L, and m=0, ..., $K_p$−1.

Symbol Detection

Maximum likelihood symbol decoding is achieved by performing minimum distance decoding over the received signal vectors. More specifically, the receiver detects K transmitted symbols by minimizing the L2-norm error between the received signal vector y and channel-processed signal vector Hs as follows:

$$\hat{s} = \arg\min_{s \in \mathbb{C}^{K \times 1}} \|y - Hs\|_2^2, \quad (19)$$

where $s \in \mathbb{C}^{K \times 1}$ is the transmitted symbol vector.

Assuming channel estimates $\hat{H}$, ML symbol estimates at the receiver are given by:

$$\hat{s} = (H^H H)^{-1} H^H y, \quad (20)$$

where $\hat{H}$ is the estimated channel matrix, built based on Equation 13 and complex channel estimates from Equations 17 and 18.

Simulation and Experimental Studies

Simulation Studies for UW-A Communications

Figure 6:
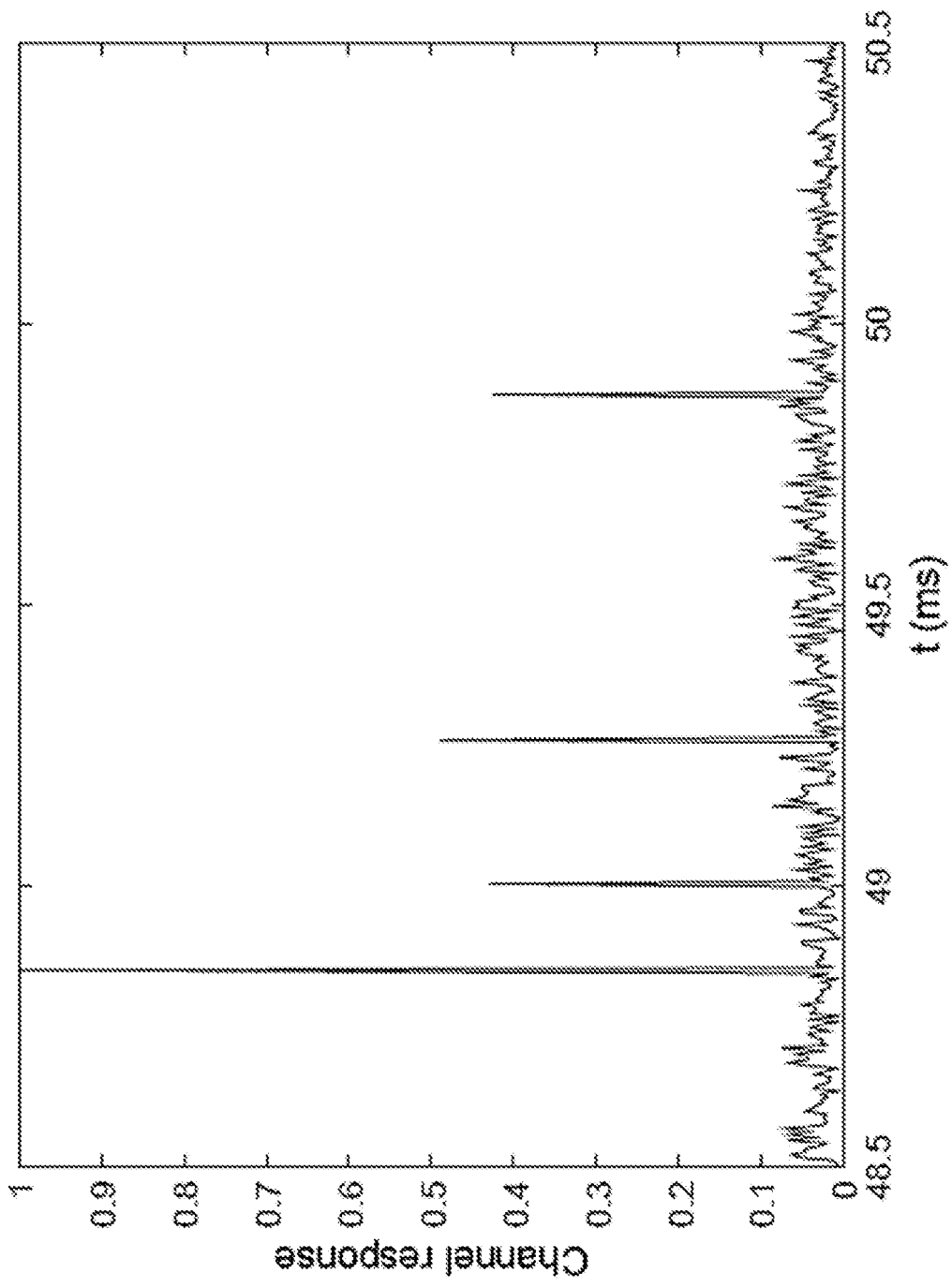
FIG. 6 is a graph showing the normalized channel response of a multipath channel model used for simulations studies.

The BER performance of the presently-disclosed MU-MCDM communication system is evaluated with simulations over UW-A channels. We consider channel amplitudes that are modeled as Rayleigh distributed random variables, and four resolvable channel propagation paths as shown in FIG. 6. We consider gray-coded binary phase shift keying (BPSK) and quadrature phase shift keying (QPSK) modulated symbols and additive white Gaussian noise at the receiver. An exemplary embodiment of the presently-disclosed communication system is tested for different numbers of subcarriers K: 128, 256, 512, and 1024 and pilot subcarriers $K_P$:

$$\frac{K}{32}, \frac{K}{16}, \frac{K}{8}, \text{ and } \frac{K}{4}.$$

Carrier frequency is set at $f_c$=100 kHz, while Δf: 64, 128, 255, and 509 Hz is selected as frequency spacing. Additional simulation parameters include: the MCDM symbol period T: 1.97, 3.93, 7.86, and 15.73 ms; the preamble duration that is fixed to $T_{pn}$=1.31 ms; the pause interval between the preamble and the MCDM symbol that is fixed to $T_p$=1.54 ms; and the guard interval between consecutive MCDM symbols that is fixed to $T_g$=2.56 ms. We consider simulation and testing of linear up-chirp waveform signals for chirp rates μ: 8.94·10³, 1.79·10⁴, 3.58·10⁴ and 7.15·10⁴ Hz/s. The effective communication bandwidth for the simulated MU-MCDM system is fixed at 65.25 kHz. Simulation results are averaged over 1000 Monte-Carlo iterations.

Figure 7:
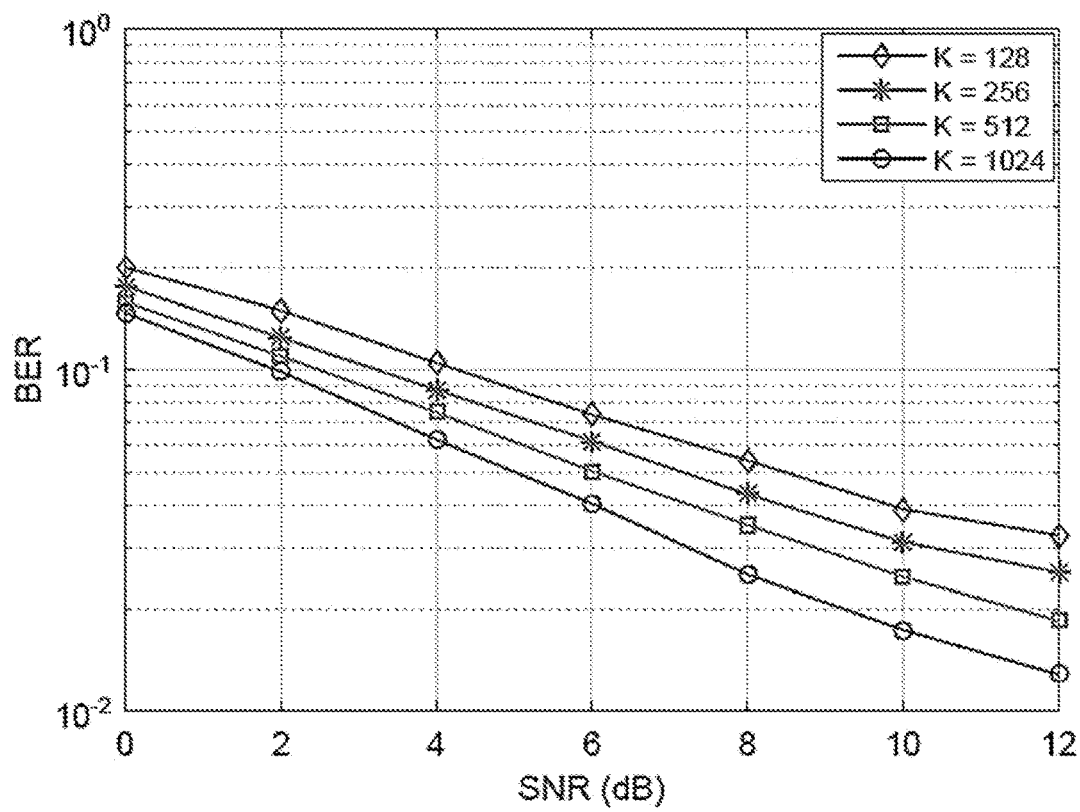
FIG. 7 is a graph showing bit-error rate ("BER") as a function of signal-to-noise ratio ("SNR") for an MCDM system with different numbers of subcarriers K.

FIG. 7 shows bit-error-rate (BER) versus signal-to-noise ratio ("SNR") for different numbers of subcarriers K. Pilot subcarriers are fixed to $$\frac{K}{4}.$$

We observe that for SNR=12 dB, the BER is decreased by 1.58 dB when we increase the total number of subcarriers from K=512 to K=1024. We observe that BER can reach to 1.28·10⁻² for K=1024 subcarriers at SNR=12 dB.

Figure 8:
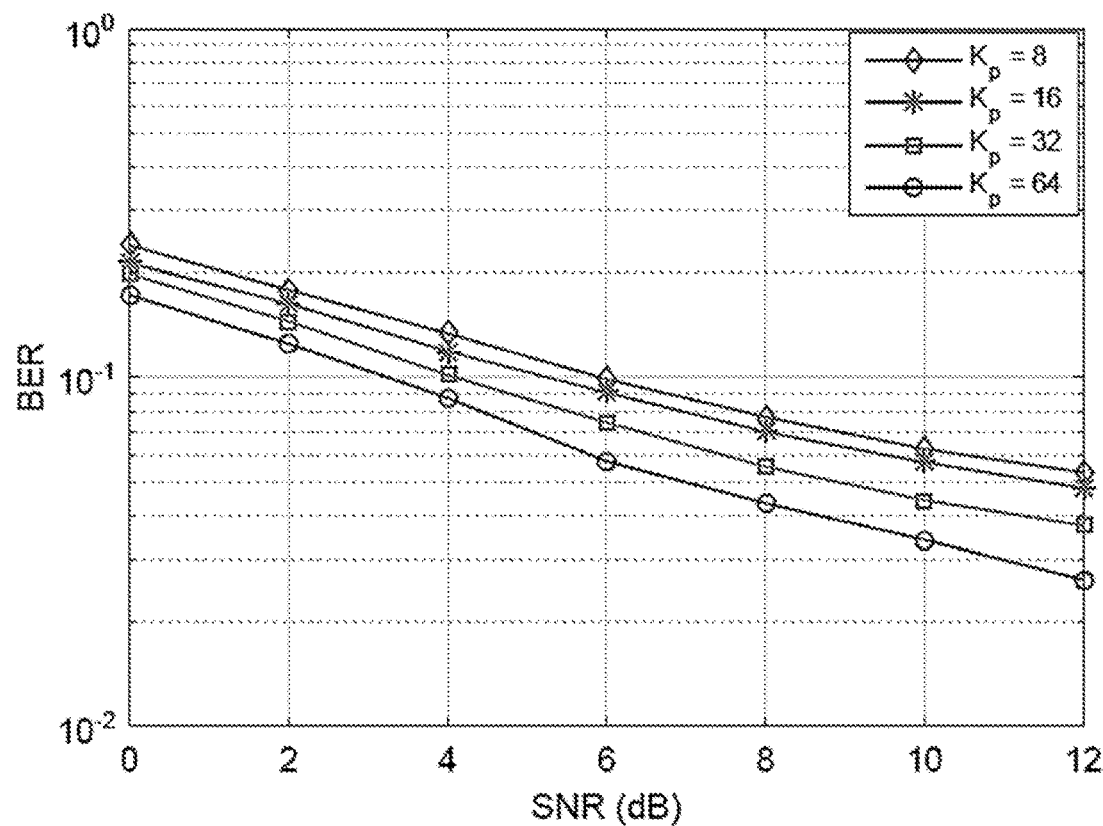
FIG. 8 is a graph showing BER as a function of SNR for different numbers of pilot subcarriers $K_p$ for a system with K=256 subcarriers.

In FIG. 8, BER to SNR values of different pilots' portion are illustrated for K=256. BER improvement for $K_p$=16 and $K_p$=8 is 0.45 dB, while that for $K_p$=64 and v=32 is 1.55 dB. BER decrease between adjacent curves is larger for higher $K_p$. For fixed K, as the number of pilots increases, respective BER is reduced significantly since CSI can estimated more accurately by increasing number of pilot symbols.

Figure 9:
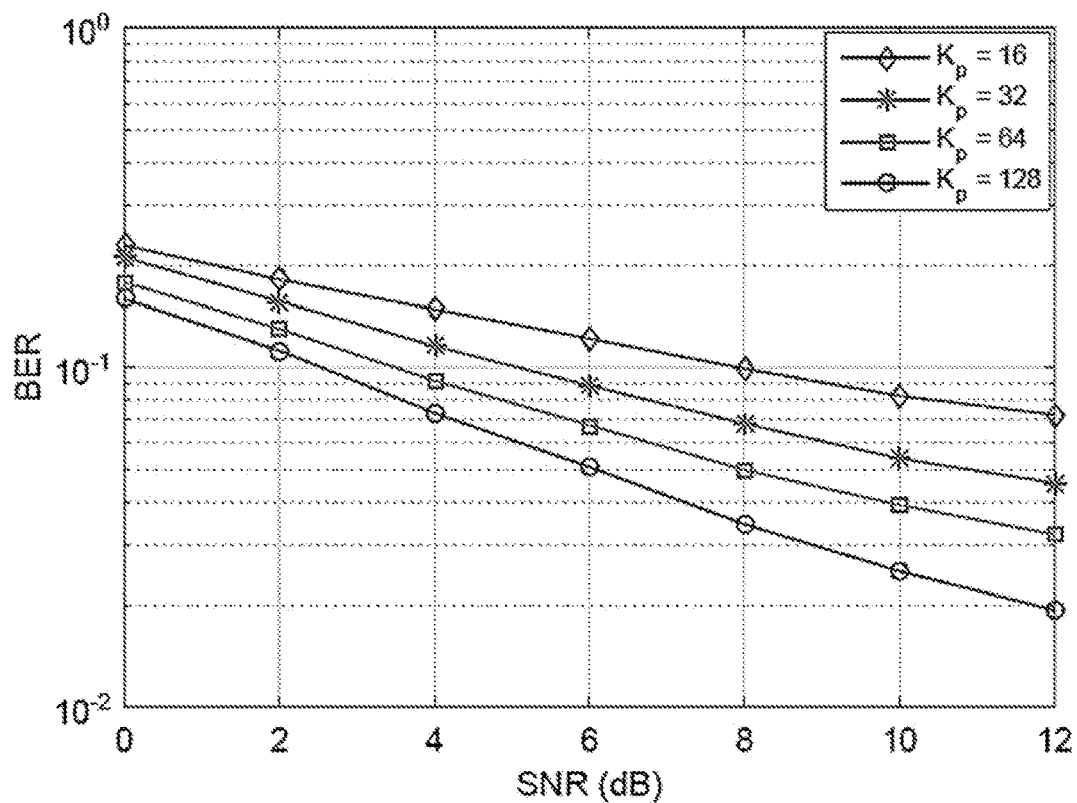
FIG. 9 is a graph showing BER as a function of SNR for different numbers of pilot subcarriers $K_p$ for a system with K=512 subcarriers.

FIG. 9 shows BER vs SNR for different numbers of pilot subcarriers and fixed total number of subcarriers K=512. At SNR=10 dB, BER is improved by 1.95 dB when the number of pilot subcarriers is increased from $K_p$=64 to $K_p$=128, whereas BER improves by 1.52 dB when the number of pilot subcarriers is increased from $K_p$=64 to $K_p$=128 at SNR=12 dB.

Figure 10:
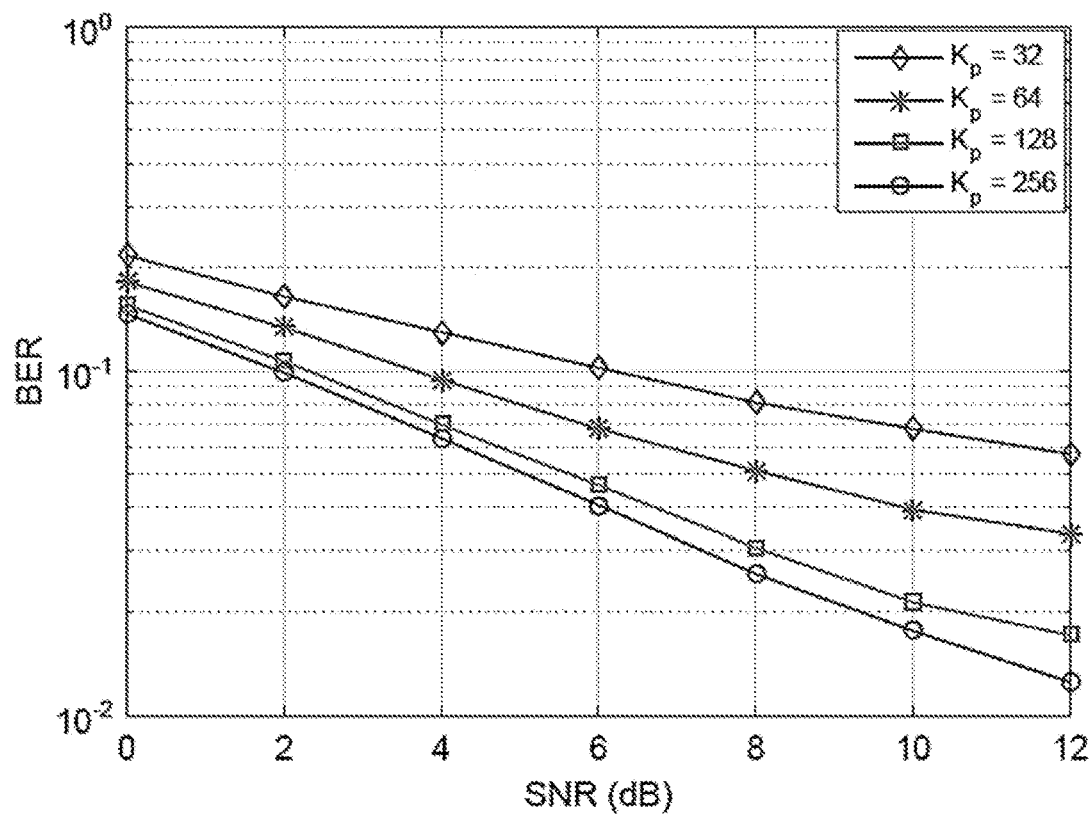
FIG. 10 is a graph showing BER as a function of SNR for different numbers of pilot subcarriers $K_p$ for a system with K=1024 subcarriers.

FIG. 10 illustrates BER vs SNR for different numbers of pilot subcarriers and fixed total number of subcarriers K=1024. Similarly to prior simulation results, higher number of pilot subcarriers can significantly benefit MCDM communication systems in terms of BER. More specifically, at SNR=10 dB, BER is improved by 0.83 dB when we increase the number of pilot subcarriers from $K_p$=128 to $K_p$=256, whereas BER is improved by 2.68 dB when we increase the number of pilot subcarriers from $K_p$=64 to $K_p$=128.

Figure 11:
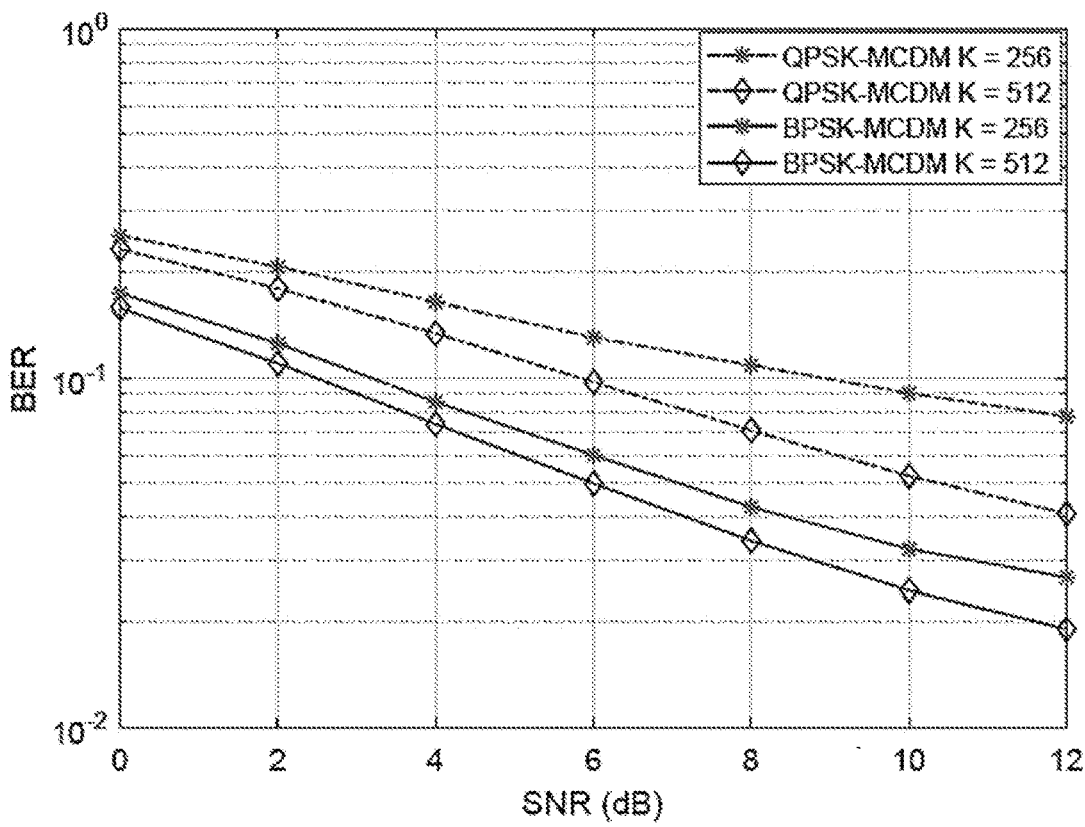
FIG. 11 is a graph showing BER as a function of SNR for binary-phase-shift keying ("BPSK") and quadrature-phase-shift-keying ("QPSK") modulation in MCDM systems for different numbers of subcarriers K.

FIG. 11 illustrates BER vs SNR for MCDM communication systems with BPSK/QPSK modulated symbols and fixed total number of subcarriers K=256, and 512. We observe that for BPSK modulated symbols and SNR=10 dB, BER improves by 1.18 dB when the number of subcarriers doubles. In addition, we observe that for K=512, increasing the modulation order (from BPSK to QPSK) and therefore the effective bit rate, increases BER by 3.30 dB at SNR=12 dB.

Figure 12:
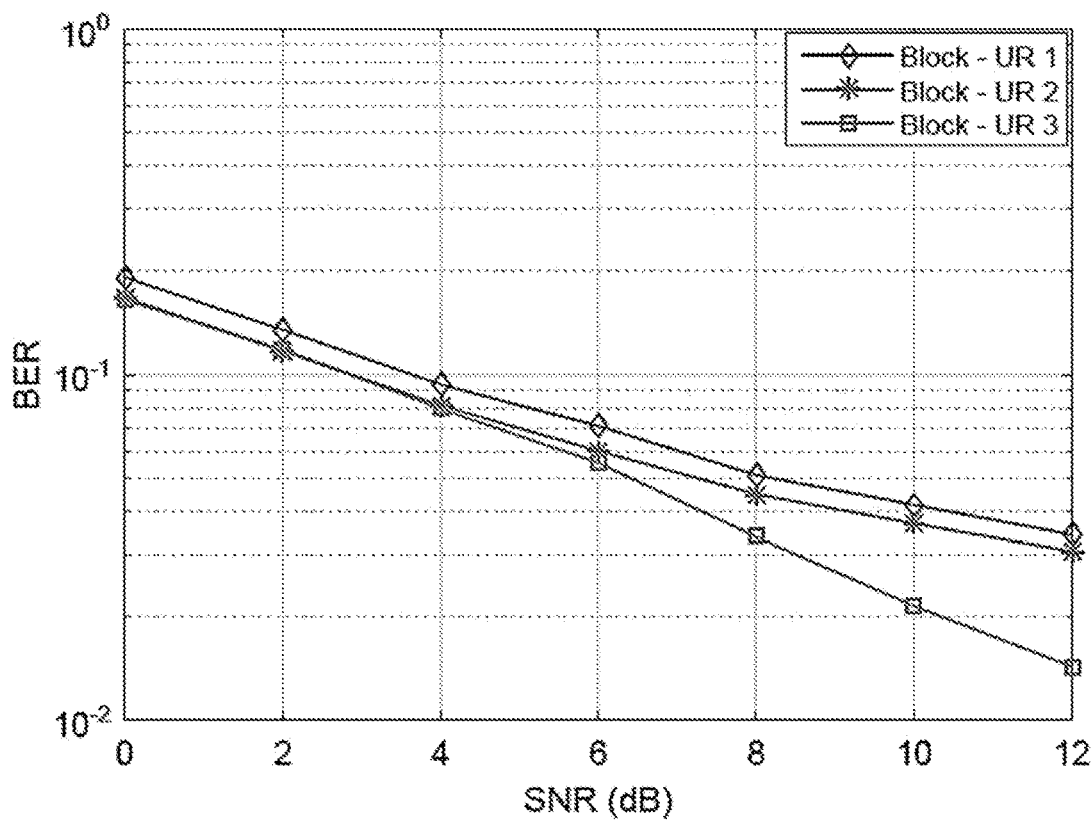
FIG. 12 is a graph showing BER as a function of SNR for an MCDM system using block-type subcarrier allocation for three different users.

FIG. 12 depicts BER vs SNR for three users, total number of subcarriers K=256 and block-type MU access. We observe that all users perform similarly from SNR=0 dB to SNR 6 dB, while User 3 outperforms both User 1 and User 2 from SNR=8 dB to SNR=12 dB. Block-type subcarrier allocation seems that favors User 3, whose BER performance for moderate SNR is less affected by frequency selective multipath fading.

Figure 13:
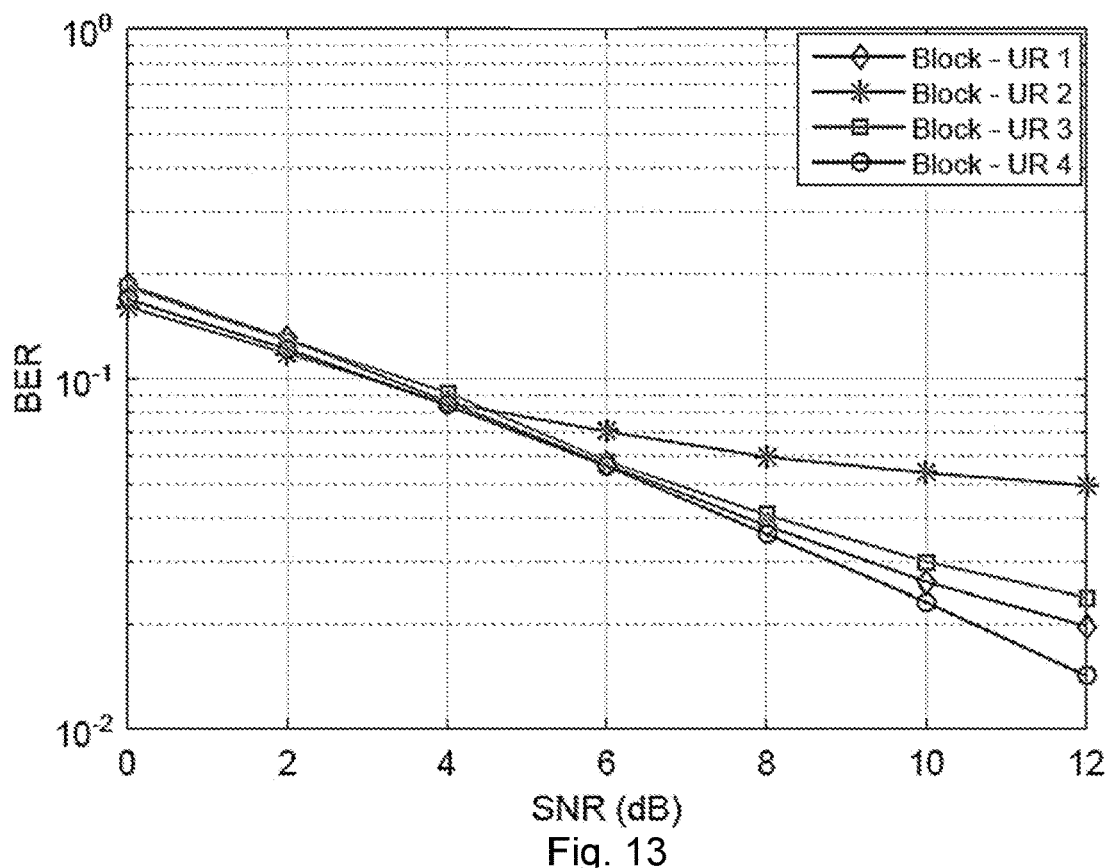
FIG. 13 is a graph showing BER as a function of SNR for an MCDM system using block-type subcarrier allocation for four different users.

FIG. 13 shows BER vs SNR values for four users, total number of subcarriers K=256 and block-type MU access.

Subcarriers are therefore divided into four blocks and assigned to users 1, 2, 3, and 4, respectively. It can be seen that Users 1, 3, and 4 achieve better BER performance than User 2 for SNR>6 dB. BER performance of User 2 reaches to a plateau for SNR >10 dB, while for SNR=12 dB, User 3 achieves 3.19 dB lower BER than User 2.

Figure 14:
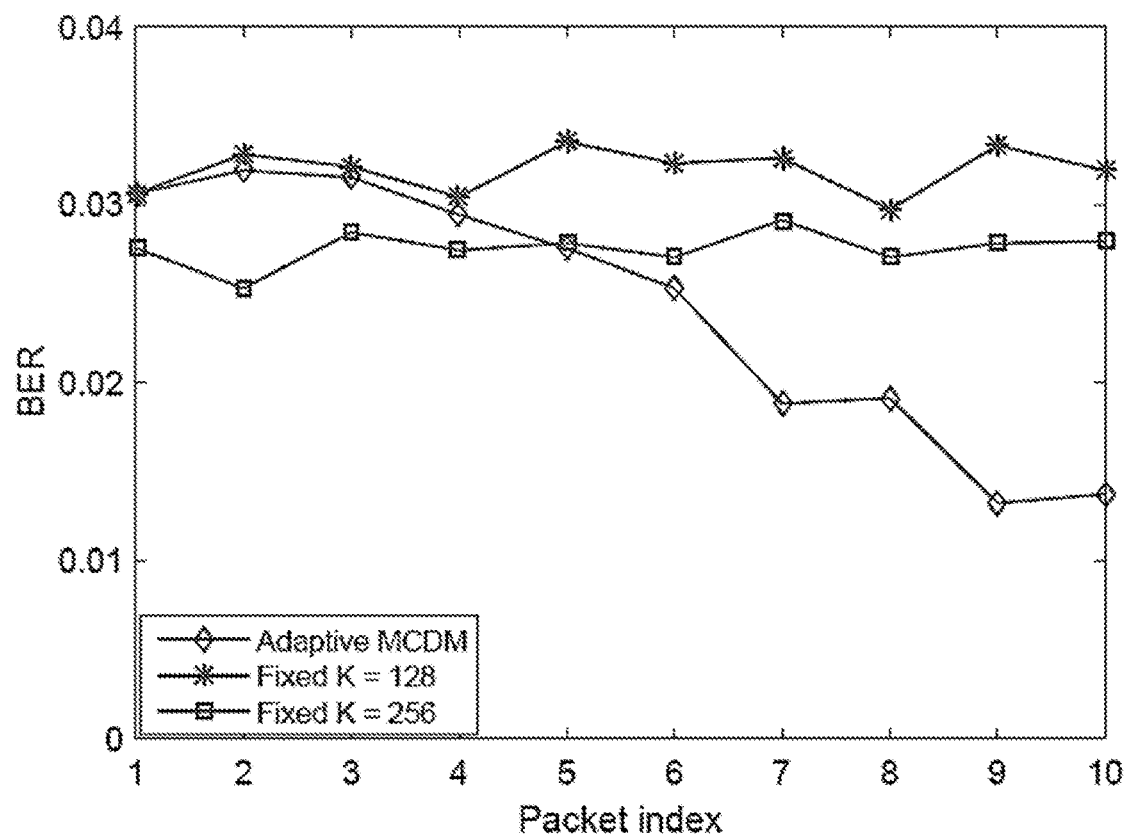
FIG. 14 is a graph showing BER as a function of packet index for an adaptive MCDM system using block-type subcarrier allocation.

FIG. 14 demonstrates average BER vs. packet/frame index for an MCDM communication system that can dynamically adapt the total number of subcarriers. We consider block-type MU access SNR fixed to 12 dB and K=128, 256, 512, and 1024. In practice, we consider the simulation of 10 packet/frame transmissions in multipath fading channels with time varying channel amplitudes. For packets 1 to 4, the presently-disclosed adaptive MCDM communication system uses K=128 subcarriers for transmission; for packets 5 to 6, K=256; for packets 7 to 8 K=512; for packets 9 to 10, K=1024. We observe that dynamic subcarrier allocation on a frame-by-frame basis achieves better BER performance than MCDM communication systems that consider fixed total number of subcarriers (i.e., K=128 and K=256).

Figure 15:
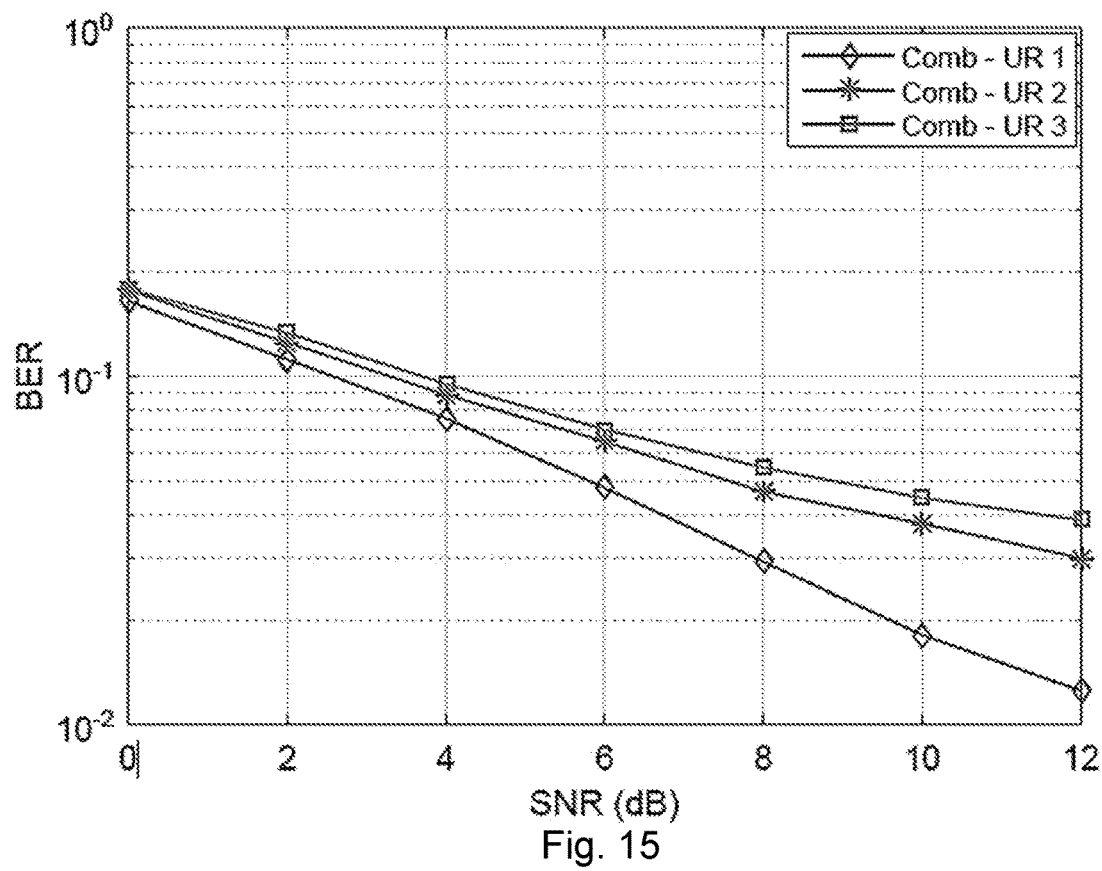
FIG. 15 is a graph showing BER as a function of SNR for an MCDM system using comb-type subcarrier allocation for three different users.

FIG. 15 shows BER vs SNR for three users, total number of subcarriers K=256 and comb-type MU access. Subcarrier allocation to multiple users follows the interleaving procedure. It can be seen that User 1 outperforms both User 2 and User 3. Particularly, comb-type subcarrier allocation favors User 1, whose BER performance is less affected by frequency selective multipath fading, while the BER performance of Users 2 and 3 degrades significantly from SNR=8 dB to SNR=12 dB.

Figure 16:
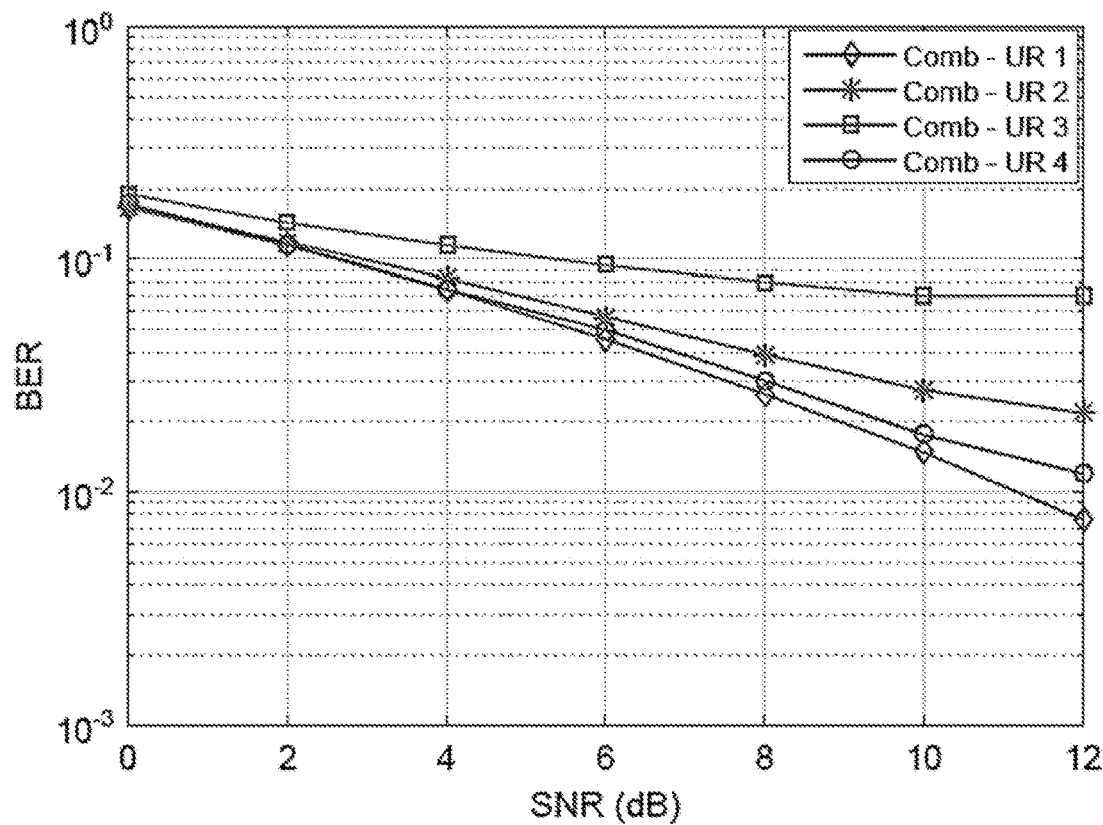
FIG. 16 is a graph showing BER as a function of SNR for an MCDM system using comb-type subcarrier allocation for four different users.

FIG. 16 illustrates BER vs SNR for four users, total number of subcarriers K=256 and comb-type MU access. Subcarrier allocation to multiple users follows the interleaving procedure. It can be seen that Users 1, 2, and 4 achieve better BER performance than User 3 for SNR=8 dB. BER performance of User 3 reaches to a plateau for SNR >8 dB. Particularly, User 2 offers improved BER by 3.11 dB when compared to the BER of User 3. BER improvement between User 1 and User 4 is only 0.58 dB.

It can be seen that uniform subcarrier allocation in simulations of comb-type MU access offers BER improvements of up to 2.71 dB when compared to the BER performance of block-type subcarrier allocation techniques.

Figure 17:
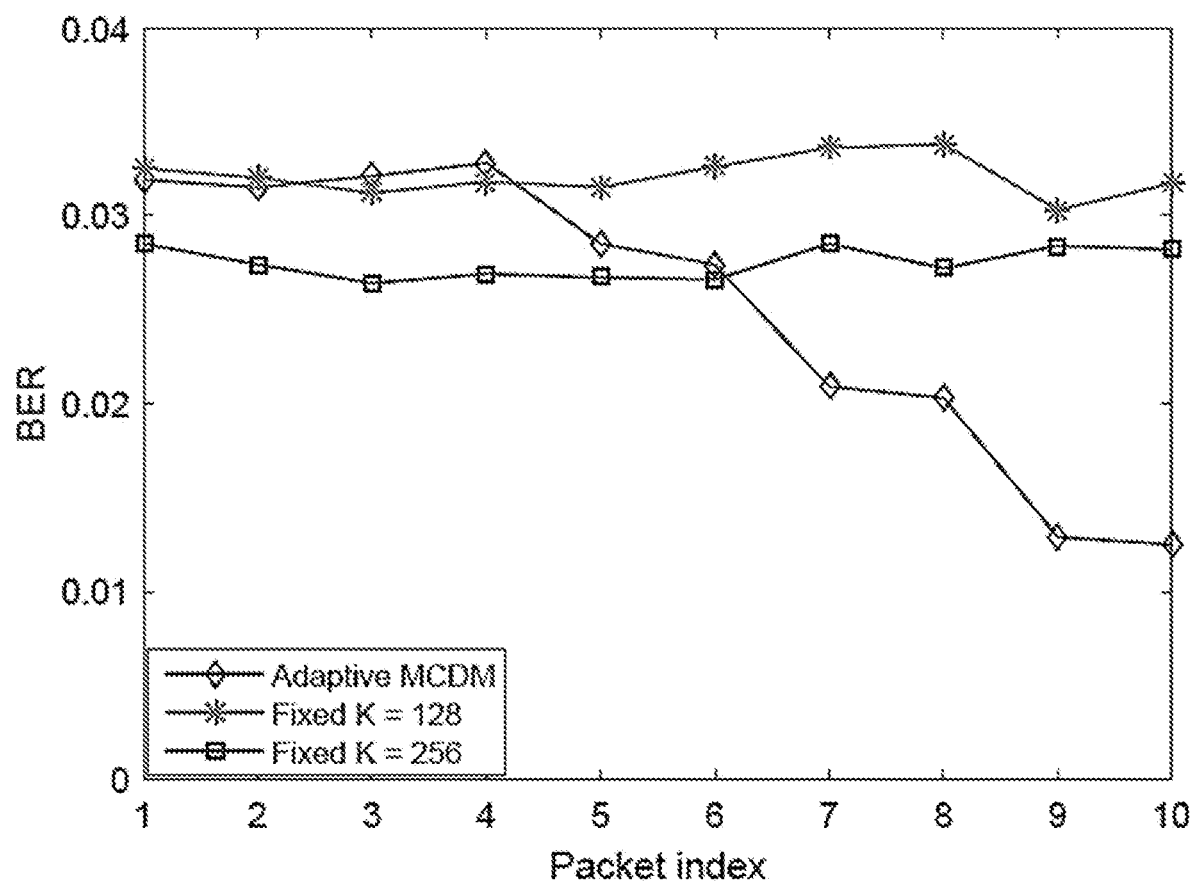
FIG. 17 is a graph showing BER as a function of packet index for an adaptive MCDM system using comb-type subcarrier allocation.

FIG. 17 demonstrates average BER vs. packet/frame index for an MCDM communication system than can dynamically adapt the total number of subcarriers. We consider comb-type MU access, SNR fixed at 12 dB and K=128, 256, 512, and 1024. In practice, we consider the simulation of 10 packet/frame transmissions in multipath fading channels with time varying channel amplitudes. For packets 1 to 4, the presently-disclosed adaptive MCDM communication system uses K=128 subcarriers for transmission; for packets 5 to 6, K=256; for packets 7 to 8 K=512; for packets 9 to 10, K=1024. We observe that dynamic subcarrier allocation on a frame-by-frame basis achieves better BER performance than MCDM communication systems that consider fixed total number of subcarriers (i.e., K=128 and K=256). At the same time, comb-type MU access offers improved BER by 0.24 dB when compared to the BER performance of the block-type MU access scheme for K=1024.

Simulation Studies for RF Communications

Figure 18:
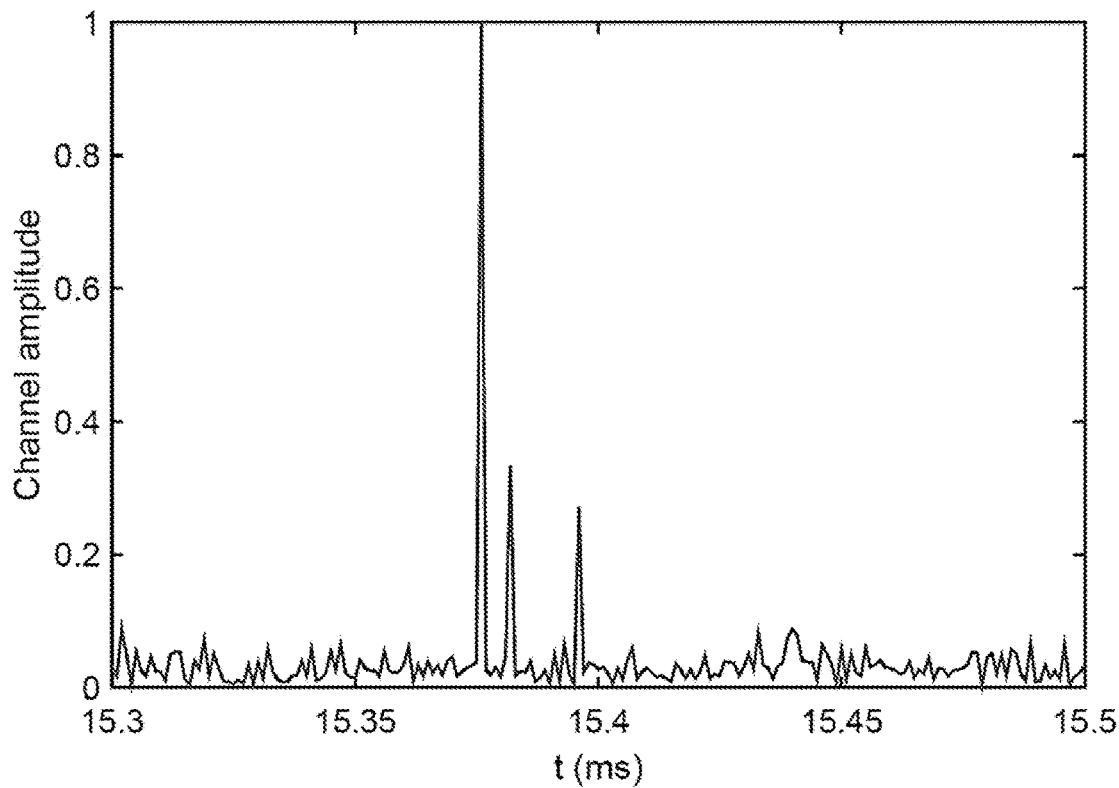
FIG. 18 is a graph showing the normalized channel response of a multipath radio-frequency ("RF") channel model used for simulation studies.

MCDM systems are simulated in RF wireless emulators. The amplitude of channel response is modeled as Rayleigh distribution and noise is white Gaussian. Normalized channel response is shown in FIG. 18. We consider several modulations, including BPSK, QPSK, 8-PSK, 16-QAM, and 32-QAM. Moreover, bit mapping for symbols is gray coded for reducing detection errors between adjacent symbols. The total number of subcarriers K is 1024, including pilot subcarriers $K_p$=256, null carriers $K_n$=56, and data subcarriers $K_s$=712. Carrier frequency $f_c$ is 2.42 GHz. The frequency spacing between subcarriers, $\Delta f$, is 488 Hz. The MCDM symbol period T is 2.05 ms, the preamble duration $T_{pn}$ is 0.26 ms, the pause interval between preambles and an MCDM symbol $T_p$ is 0.51 ms, and the guard interval between MCDM symbols $T_g$ is 0.51 ms. Linear up-chirps are applied, as chirp rate $\mu$ is chosen as $2.38 \cdot 10^5$ Hz/s. Available bandwidth for the MCDM system is 500.50 kHz.

Figure 19:
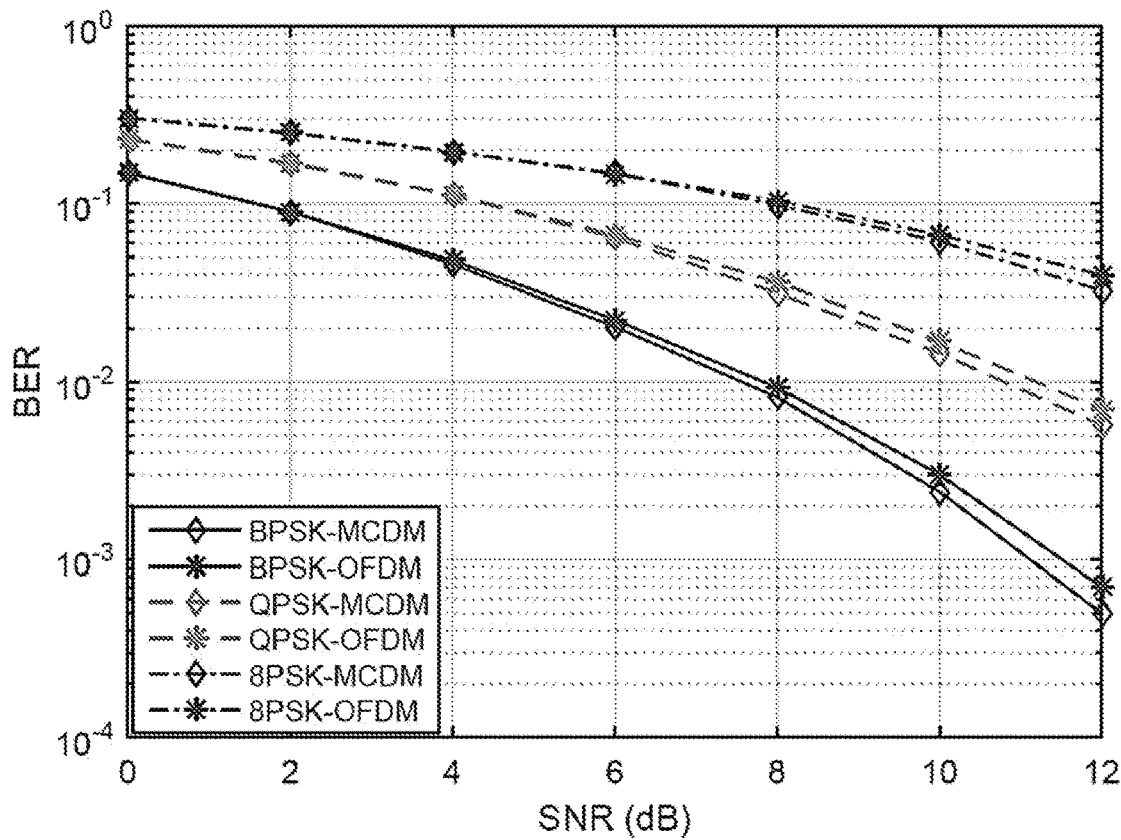
FIG. 19 is a graph showing BER as a function of SNR for binary-phase-shift keying ("BPSK"), quadrature-phase-shift-keying ("QPSK"), and 8-phase-shift-keying ("8-PSK") modulations in MCDM and orthogonal frequency division multiplexing ("OFDM") systems.

FIG. 19 shows BER vs SNR for BPSK, QPSK, and 8-PSK modulated symbols in MCDM and OFDM communication systems. For SNR=12 dB and BPSK modulation, the BER of the presently-disclosed MCDM communication system is improved by 1.46 dB compared to the BER of a traditional OFDM system, while for SNR=10 dB and QPSK modulation, the BER performance of MCDM is enhanced by 0.67 dB. The presently-disclosed MCDM communication system achieves the bit rate of 834.38 kbit/s (kbps), at BER of $3.25 \cdot 10^{-2}$ at SNR=12 dB.

Figure 20:
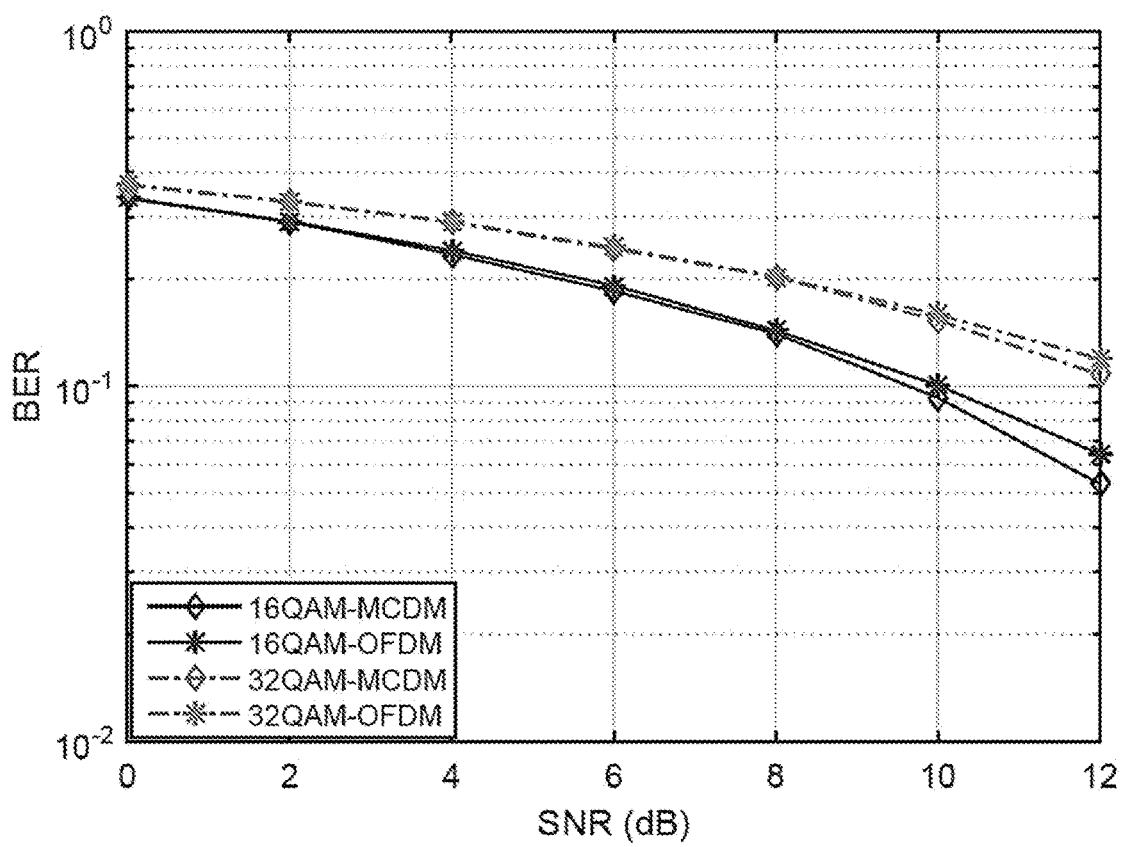
FIG. 20 is a graph showing BER as a function of SNR for 16-quadrature amplitude modulation ("16-QAM") and 32-QAM in MCDM and OFDM systems.

FIG. 20 illustrates BER vs SNR for 16-QAM and 32-QAM modulations. For SNR=12 dB and 16-QAM modulation, the BER of the presently-disclosed MCDM communication system is enhanced by 0.85 dB compared to the BER of a traditional OFDM system. Bit rate is increased by 25% for 32-QAM modulation at the expense of increased BER by 3.09 dB for SNR=12 dB.

The effective bit rate for 32-QAM modulation is calculated as $$\frac{K_s}{T+T_g} \cdot \log_2 32 = 1.39 \; Mbps. \tag{21}$$

Over-the-Air Radio Experiments

Figure 21:
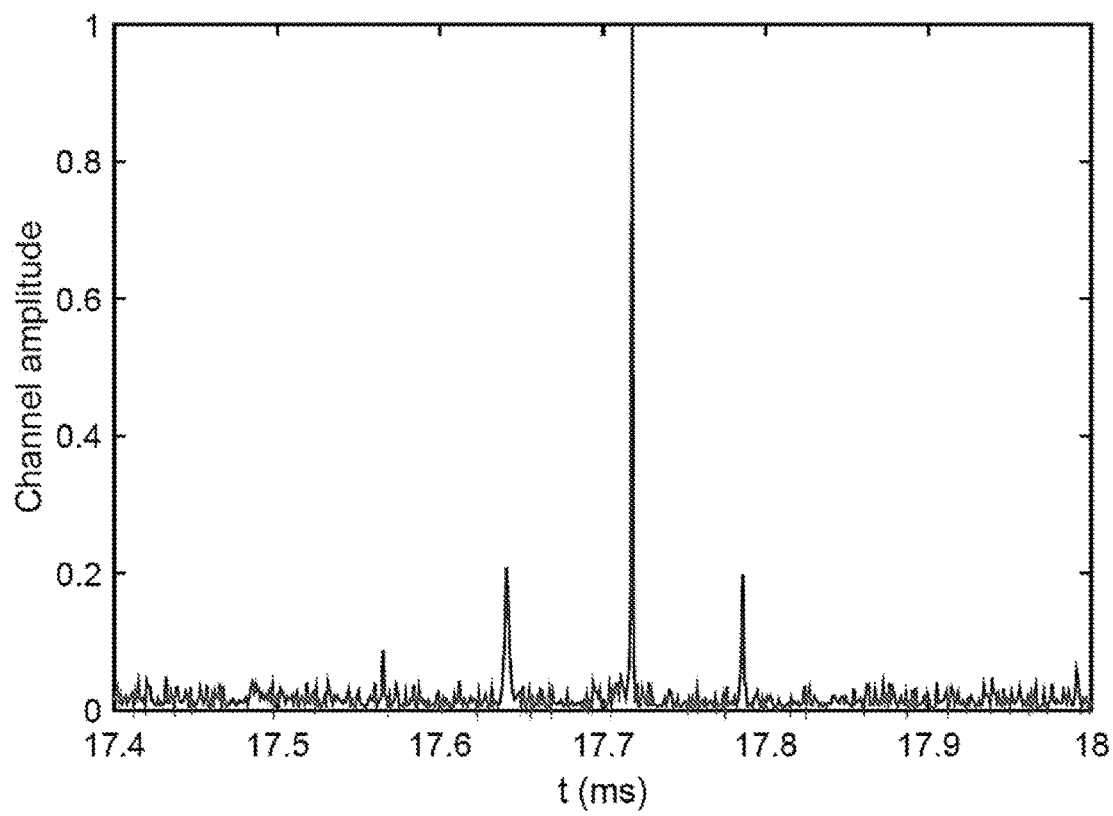
FIG. 21 is a graph showing the normalized channel response recorded during experiments in an indoor multipath laboratory environment.

The BER performance of the presently-disclosed MU-MCDM communication system is evaluated with over-the-air radio measurements in an indoor software-defined radio testbed. Software-defined radio platforms operate at carrier frequency $f_c$=2.47 GHz, while sampling frequency $f_s$ is fixed to 1 MHz. We consider gray coding for bit mapping and test BPSK, QPSK, 8-PSK, 16-QAM, and 32-QAM modulations. The total number of subcarriers is fixed to K=1024, with pilot subcarriers $K_p$=256, null subcarriers $K_n$=56, and data subcarriers $K_s$=712. The frequency spacing is fixed to $\Delta f$=488 Hz. Additional testbed parameters include: the MCDM symbol period that is fixed to T=2.05 ms; the preamble duration that is fixed to $T_{pn}$=1.02 ms; the pause interval between the preamble and the MCDM symbol that is fixed to $T_p$=0.51 ms; and the guard interval between consecutive MCDM symbols that is fixed to $T_g$=0.51 ms. We consider implementation and testing of linear up-chirp signal waveforms with chirp rate $\mu$: $2.44 \cdot 10^5$ Hz/s. The effective communication bandwidth for the experimental MCDM communication system is 500.50 kHz. A snapshot of the normalized channel response is illustrated in FIG. 21. Experimental results are averaged over 3000 packet/frame transmissions.

Figure 22:
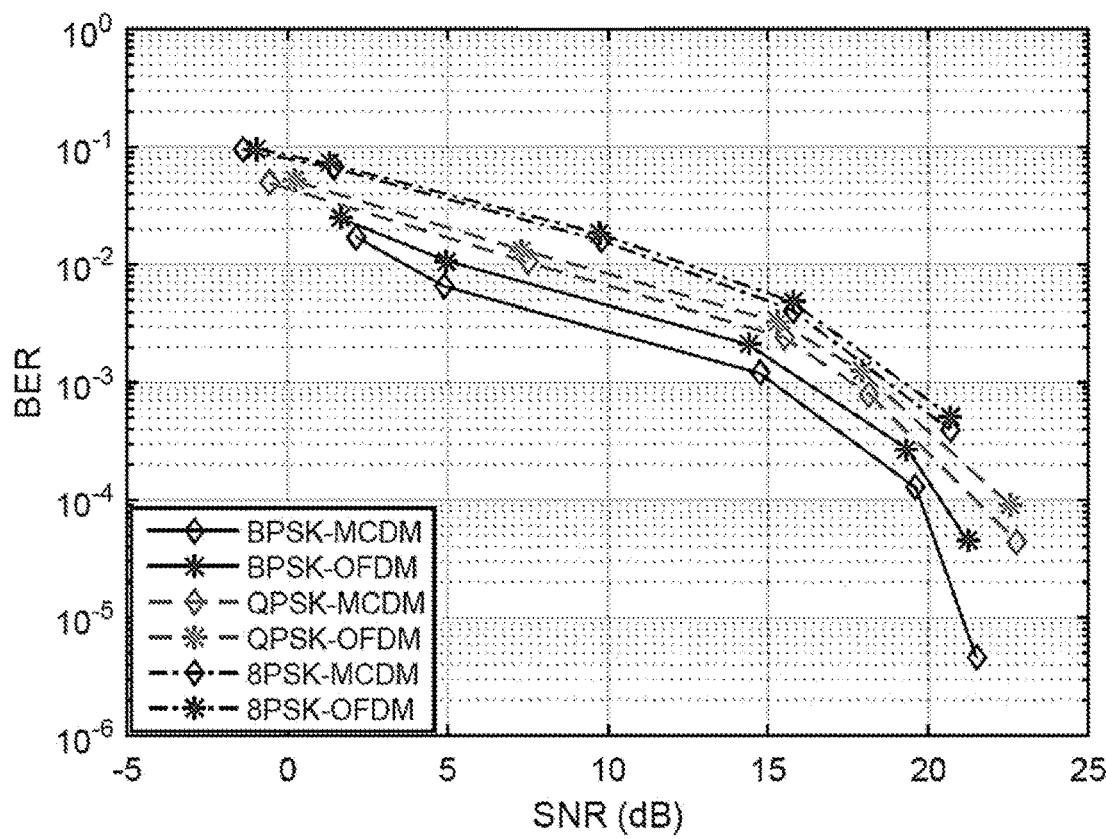
FIG. 22 is a graph showing BER as a function of SNR for BPSK, QPSK, and 8-PSK modulations in MCDM and OFDM systems.

FIG. 22 shows experimental measurements of BER vs pre-detection SNR for BPSK, QPSK, and 8-PSK modulated symbols in MCDM and OFDM communication systems. For SNR=21.49 dB and BPSK modulation, the BER of the presently-disclosed MCDM communication system is improved by 9.64 dB compared to the BER of a traditional OFDM system. We observe that significant BER improvement over traditional OFDM systems is achieved for pre-detection SNR >20 dB. We notice that chirp signal waveforms in MCDM systems can enhance their robustness against ISI due to multipath propagation. Additionally, MCDM systems achieve BER of $8.03 \cdot 10^{-4}$ for QPSK modulation, and BER of $1.45 \cdot 10^{-3}$ for 8-PSK modulation with pre-detection SNR=18.12 dB. As symbol energy is fixed among different PSK modulation orders, we expect that the higher the modulation order, the smaller the Euclidean distance between adjacent constellation symbols, therefore BER increases.

Figure 23:
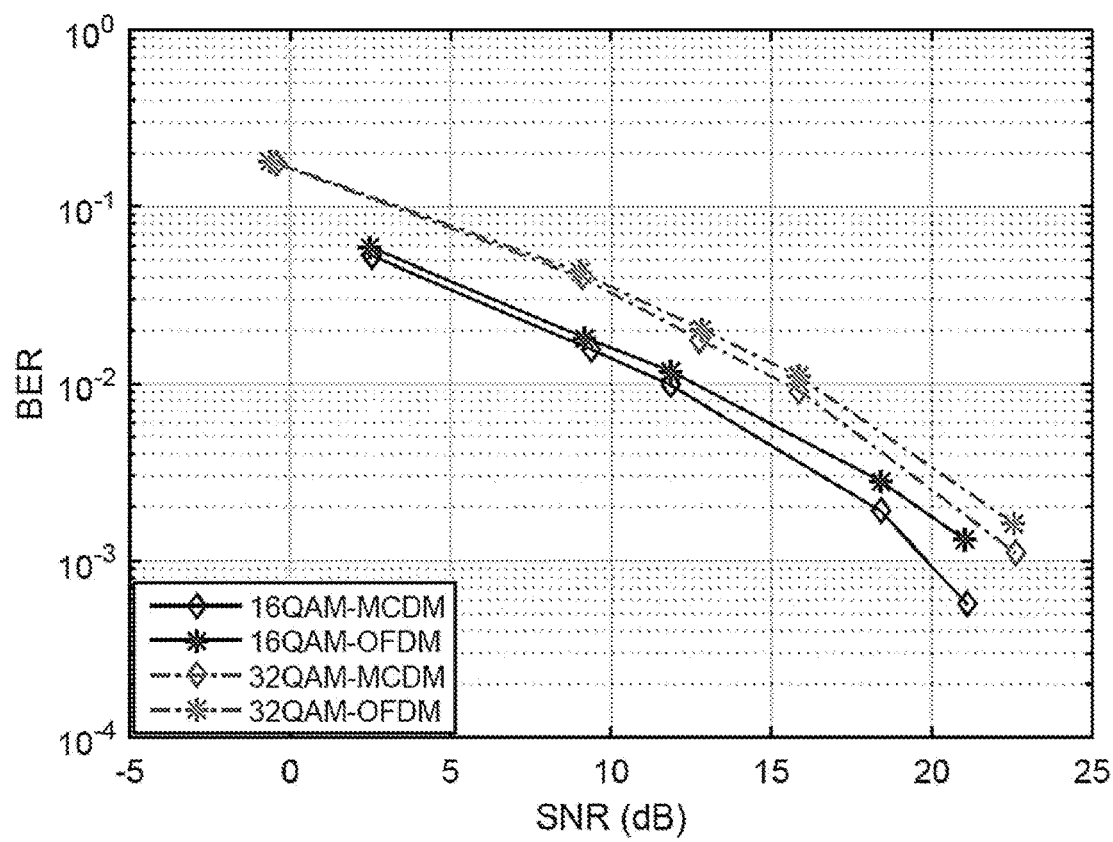
FIG. 23 is a graph showing BER as a function of SNR for a 16-QAM and 32-QAM modulations in MCDM and OFDM systems.

FIG. 23 demonstrates experimental measurements of BER vs pre-detection SNR for 16-QAM and 32-QAM modulations. For pre-detection SNR=21.04 dB and 16-QAM modulation, the BER of the presently-disclosed MCDM communication system is enhanced by 3.58 dB compared to the BER of a traditional OFDM system. We observe that BER performance improvements for the presently-disclosed system are better for high order QAM modulations than for high order PSK modulations as amplitude modulations are resilient to phase errors introduced by radio transceivers and the indoor multipath channel. For pre-detection SNR=22.58 dB and 32-QAM modulation, the BER of MCDM is enhanced by 1.63 dB compared to the BER of an OFDM system, while for pre-detection SNR=22.58 dB the presently-disclosed system achieves BER of $1.12 \cdot 10^{-3}$.

Although the present disclosure has been described with respect to one or more particular embodiments, it will be understood that other embodiments of the present disclosure may be made without departing from the spirit and scope of the present disclosure.

What is claimed is:

1. A transmitter for multiuser multicarrier-chirp-division-multiplexing ("MU-MCDM") communication, comprising:
   a symbol mapper configured to map a multiuser data set to a plurality of baseband symbols;
   an inverse orthogonal chirp transform configured to modulate the plurality of baseband symbols to a plurality of chirp modulated waveforms according to a predetermined subcarrier allocation scheme and generate a plurality of parallel multicarrier chirp division multiplexing ("MCDM") symbols mapped to frequency subcarriers;
   a parallel-to-serial converter configured to convert the plurality of parallel MCDM symbols into a serial digital signal, wherein the serial digital signal comprises the plurality of MCDM symbols as consecutive MCDM symbols;
   a preamble module configured to insert one or more preamble blocks into the serial digital signal; and
   a zero padding module configured to insert one or more zero values between consecutive MCDM symbols in the serial digital signal.

2. The transmitter of claim 1, further comprising a radio comprising:
   a digital-to-analog convertor configured to convert the serial digital signal into an analog baseband frequency signal;
   a mixer configured to upconvert the analog baseband frequency signal into an analog carrier frequency signal;
   a power amplifier configured to increase the amplitude of the analog carrier frequency signal; and
   an acoustic transducer or an antenna configured to transmit the analog carrier signal in acoustic or radio frequencies.

3. The transmitter of claim 2, wherein the radio further comprises a processor configured to digitally upsample the sampled signal.

4. The transmitter of claim 2, wherein the acoustic transducer has a vertical axis and a horizontal axis, and is configured to produce a directivity pattern omnidirectional with respect to the vertical axis and the horizontal axis.

5. The transmitter of claim 2, wherein the antenna is directional or omnidirectional, and is configured to transmit signals in the Industrial, Scientific, and Medical ("ISM") frequency band.

6. The transmitter of claim 1, wherein the plurality of baseband symbols are symbols of a phase shift keying or quadrature amplitude digital modulation scheme.

7. The transmitter of claim 1, wherein the subcarrier allocation scheme is configured for block-type multiuser access or comb-type multiuser access.

8. The transmitter of claim 1, wherein the serial digital signal further comprises a plurality of pilot/training symbols assigned to one or more pilot subcarriers.

9. A receiver for multiuser multicarrier-chirp-division-multiplexing ("MU-MCDM") communication, comprising:
   a serial-to-parallel converter configured to convert a serial digital signal into a plurality of MCDM symbols mapped to a plurality of frequency subcarriers;
   an orthogonal chirp transform configured to demodulate the plurality of MCDM symbols according to a plurality of chirp modulated waveforms and generate a plurality of baseband symbols;
   a channel estimator configured to estimate channel coefficients of each frequency subcarrier of the plurality of frequency subcarriers;
   a symbol detector configured to detect a multiuser data set based on the channel coefficients and the baseband symbols.

10. The receiver of claim 9, further comprising a software-defined radio comprising:
    an acoustic transducer or antenna configured to receive an analog carrier frequency signal;
    a power amplifier configured to increase the amplitude of the analog carrier frequency signal;
    a band pass filter configured to remove out-of-band frequency components from the analog carrier frequency signal;
    a mixer configured to downconvert the analog carrier frequency signal into an analog baseband frequency signal; and
    an analog-to-digital convertor configured to convert the analog baseband frequency signal into the serial digital signal.

11. The receiver of claim 10, further comprising a processor configured for digital downsampling of the serial digital signal.

12. The receiver of claim 10, wherein the acoustic transducer has a vertical axis and a horizontal axis, and is configured to receive with a directivity pattern omnidirectional with respect to the vertical axis and the horizontal axis.

13. The receiver of claim 9, further comprising a packet/frame synchronization module configured to detect one or more preamble blocks of the serial digital signal.

14. The receiver of claim 9, wherein the plurality of baseband symbols are symbols of a phase shift keying or quadrature amplitude digital modulation scheme.

15. The receiver of claim 9, wherein the channel estimator is configured to estimate the channel coefficients of a group of frequency subcarriers based on a plurality of pilot subcarriers.

16. A method for multiuser multicarrier-chirp-division-multiplexing ("MU-MCDM") communications, comprising:
- mapping a multiuser data set to a plurality of baseband symbols;
- using an inverse orthogonal chirp transform to modulate the plurality of baseband symbols with a plurality of chirp modulated waveforms according to a predetermined subcarrier allocation scheme and generate a plurality of parallel MCDM symbols mapped to frequency subcarriers;
- converting the plurality of parallel MCDM symbols into a serial digital signal, wherein the serial digital signal comprises the plurality of MCDM symbols as consecutive MCDM symbols;
- inserting one or more preamble blocks into the serial digital signal;
- inserting zero-padding blocks between consecutive MCDM symbols of the serial digital signal;
- converting the serial digital signal into an analog baseband frequency signal;
- upconverting the analog baseband frequency signal into an analog carrier frequency signal; and
- transmitting the analog carrier frequency signal in acoustic or radio frequencies.

17. The method of claim 16, further comprising digitally upsampling the serial digital signal.

18. The method of claim 16, further comprising amplifying the analog carrier frequency signal.

19. The method of claim 16, wherein the plurality of baseband symbols are symbols of a digital modulation scheme.

20. The method of claim 16, wherein the subcarrier allocation scheme is configured for block-type multiuser access or comb-type multiuser access.

* * * * *